US011356662B2

(12) United States Patent
Hu et al.

(10) Patent No.: US 11,356,662 B2
(45) Date of Patent: Jun. 7, 2022

(54) SIMPLIFICATION OF CLIPPING VALUE CALCULATION FOR ADAPTIVE LOOP FILTERS

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/878,436

(22) Filed: May 19, 2020

(65) Prior Publication Data

US 2020/0374518 A1 Nov. 26, 2020

Related U.S. Application Data

(60) Provisional application No. 62/851,064, filed on May 21, 2019.

(51) Int. Cl.
*H04N 19/117* (2014.01)
*H04N 19/14* (2014.01)
*H04N 19/176* (2014.01)
*H04N 19/82* (2014.01)

(52) U.S. Cl.
CPC ........... *H04N 19/117* (2014.11); *H04N 19/14* (2014.11); *H04N 19/176* (2014.11); *H04N 19/82* (2014.11)

(58) Field of Classification Search
CPC combination set(s) only.
See application file for complete search history.

(56) References Cited

U.S. PATENT DOCUMENTS

| 2004/0101059 | A1* | 5/2004 | Joch | H04N 19/176 375/240.29 |
| 2011/0274158 | A1* | 11/2011 | Fu | H04N 19/439 375/240.02 |
| 2011/0305277 | A1* | 12/2011 | Fu | H04N 19/46 375/240.12 |
| 2013/0094572 | A1* | 4/2013 | Van der Auwera | H04N 19/126 375/240.03 |
| 2014/0294061 | A1* | 10/2014 | Zhang | H04N 19/70 375/240.02 |

OTHER PUBLICATIONS

Benjamin Bross,ersatile Video Coding (Draft 5), 14. JVET Meeting, pub. Mar. 19-27, 2019 (Year: 2019).*

(Continued)

*Primary Examiner* — Md N Haque
(74) *Attorney, Agent, or Firm* — Polsinelli LLP

(57) ABSTRACT

Systems, methods, and computer-readable media are provided for simplification of clipping value calculations for adaptive loop filtering. An example method can include obtaining video data including one or more pictures; obtaining a block of a picture from the one or more pictures; determining clipping values for a filter, the clipping values corresponding to a luma component in the picture and/or a chroma component in the picture, wherein each clipping value is determined by left shifting a first integer by a second integer, the second integer including a result of a bit depth value for a sample from the picture minus an offset value associated with a clipping index value; and applying the filter to the block.

32 Claims, 11 Drawing Sheets

(56) References Cited

OTHER PUBLICATIONS

Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19, 2019-Mar. 27, 2019, No. JVET-N1001, May 14, 2019 (May 14, 2019), XP030205193, 370 pages, Retrieved from the Internet: URL:http://phenix.int-evry.fr/jvet/doc_end_user/documents/14_Geneva/wg11/JVET-N1001-v5.zip JVET-N1001-v5.docx, [retrieved on May 14, 2019] pp. 94-98, paragraph 7.4.6.3., cited in the application Section 8.5.6.4;p. 212-p. 214.
International Search Report and Written Opinion—PCT/US2020/033711—ISA/EPO—dated Jul. 6, 2020.
Taquet (Canon) J., et al., "Non-CE5: Complementary Results of Tests CE5-3 on Non-Linear ALF," 14. JVET Meeting; Mar. 19, 2019-Mar. 27, 2019, Geneva; (The Joint Video Exploration Team of ISO/IEC JTC1/SC29/WG11 and ITU-T SG.16), No. JVET-N0243, Mar. 21, 2019 (Mar. 21, 2019), XP030204152, 10 pages, Retrieved from the Internet:URL:http://phenix.int-evry.fr/jvet/doc_end_user/documents/14_Geneva/wg11/JVET-N0243-v3.zip JVET-N0243 v2.0_clean.docx [retrieved on Mar. 21, 2019], the whole document.

\* cited by examiner

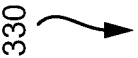
FIG. 3B
FIG. 3A

(No Transformation)

FIG. 4B (Diagonal)

| 418 C0 |
|---|

| 408 C3 | 416 C2 | 424 C1 |
|---|---|---|

| 402 C4 | 406 C5 | 414 C6 | 422 C5 | 426 C4 |
|---|---|---|---|---|

| 404 C1 | 412 C2 | 420 C3 |
|---|---|---|

| 410 C0 |
|---|

430 →

FIG. 4C (Vertical)

| 418 C4 |
|---|

| 408 C1 | 416 C5 | 424 C3 |
|---|---|---|

| 402 C0 | 406 C2 | 414 C6 | 422 C2 | 426 C0 |
|---|---|---|---|---|

| 404 C3 | 412 C5 | 420 C1 |
|---|---|---|

| 410 C4 |
|---|

440 →

FIG. 4D (Rotation)

| 418 C0 |
|---|

| 408 C1 | 416 C2 | 424 C3 |
|---|---|---|

| 402 C4 | 406 C5 | 414 C6 | 422 C5 | 426 C4 |
|---|---|---|---|---|

| 404 C3 | 412 C2 | 420 C1 |
|---|---|---|

| 410 C0 |
|---|

450 →

| Bit Depth | Clipping Index (clipIdx) | | | |
| --- | --- | --- | --- | --- |
| | 0 | 1 | 2 | 3 |
| 8 | $2^8$ | $2^5$ | $2^3$ | $2^1$ |
| 9 | $2^9$ | $2^6$ | $2^4$ | $2^2$ |
| 10 | $2^{10}$ | $2^7$ | $2^5$ | $2^3$ |
| 11 | $2^{11}$ | $2^8$ | $2^6$ | $2^4$ |
| 12 | $2^{12}$ | $2^9$ | $2^7$ | $2^5$ |
| 13 | $2^{13}$ | $2^{10}$ | $2^8$ | $2^6$ |
| 14 | $2^{14}$ | $2^{11}$ | $2^9$ | $2^7$ |
| 15 | $2^{15}$ | $2^{12}$ | $2^{10}$ | $2^8$ |
| 16 | $2^{16}$ | $2^{13}$ | $2^{11}$ | $2^9$ |

SIMPLIFICATION OF CLIPPING VALUE CALCULATION FOR ADAPTIVE LOOP FILTERS

CROSS-REFERENCE TO RELATED APPLICATIONS

This application claims the benefit of U.S. Provisional Application No. 62/851,064, filed May 21, 2019, which is hereby incorporated by reference, in its entirety and for all purposes.

TECHNICAL FIELD

The present disclosure generally relates to video coding. In some examples, aspects of the present disclosure relate to simplifying clipping value calculations for adaptive loop filters and/or other filters used for encoding and/or decoding video data.

BACKGROUND

Many types of computing devices and systems allow video data to be processed and output for consumption. Digital video data includes large amounts of data, generally driven in part by large demands from consumers and video providers. For example, consumers of video data desire high quality videos, with high fidelity, resolution, frame rates, and the like. The large amount of video data typically necessary to meet such demands places a large burden on the communication networks and devices that process and store such video data. In general, various video coding techniques can be used to compress video data and thereby limit the bandwidth and storage burden of such video data on communication networks and devices.

Video coding can be performed according to one or more video coding standards. Example video coding standards include versatile video coding (VVC), high-efficiency video coding (HEVC), advanced video coding (AVC), moving picture experts group (MPEG) coding, among others. Video coding generally utilizes prediction methods (e.g., inter-prediction, intra-prediction, or the like) that take advantage of redundancy present in video images or sequences. Video coding techniques can use such redundancy to compress video data into a form that uses a lower bit rate, while avoiding or minimizing degradations of video quality. With ever-evolving video services becoming available, encoding techniques with better coding efficiency are needed.

BRIEF SUMMARY

Disclosed are systems, methods, and computer-readable media for effectively and efficiently calculating clipping values for adaptive loop filters used in video coding. According to at least one example, a method is provided for simplified and efficient calculation of clipping values for adaptive loop filters. The method can include obtaining video data including one or more pictures; obtaining a block of a picture from the one or more pictures; determining clipping values for at least one filter, the clipping values corresponding to at least one of a luma component of the block and a chroma component of the block, wherein a clipping value of the clipping values is determined by left shifting a first integer by a second integer, the second integer including a result of a bit depth value for a sample from the block minus an offset value associated with a clipping index value; and applying the at least one filter to the block.

According to at least one example, an apparatus is provided for simplified and efficient calculation of clipping values for adaptive loop filters. The apparatus can include memory and one or more processors coupled to the memory, the one or more processors being configured to: obtain video data including one or more pictures; obtain a block of a picture from the one or more pictures; determine clipping values for at least one filter, the clipping values corresponding to at least one of a luma component of the block and a chroma component of the block, wherein a clipping value of the clipping values is determined by left shifting a first integer by a second integer, the second integer including a result of a bit depth value for a sample from the block minus an offset value associated with a clipping index value; and applying the at least one filter to the block.

According to at least one example, another apparatus is provided for simplified and efficient calculation of clipping values for adaptive loop filters. The apparatus can include means for obtaining video data including one or more pictures; obtaining a block of a picture from the one or more pictures; means for determining clipping values for at least one filter, the clipping values corresponding to at least one of a luma component of the block and a chroma component of the block, wherein a clipping value of the clipping values is determined by left shifting a first integer by a second integer, the second integer including a result of a bit depth value for a sample from the block minus an offset value associated with a clipping index value; and means for applying the at least one filter to the block.

According to at least one example, a non-transitory computer-readable storage medium is provided for simplified and efficient calculation of clipping values for adaptive loop filters. The non-transitory computer-readable storage medium can include instructions stored thereon which, when executed by one or more processors, cause the one or more processors to obtain video data including one or more pictures; obtain a block of a picture from the one or more pictures; determine clipping values for at least one filter, the clipping values corresponding to at least one of a luma component of the block and a chroma component of the block, wherein a clipping value of the clipping values is determined by left shifting a first integer by a second integer, the second integer including a result of a bit depth value for a sample from the block minus an offset value associated with a clipping index value; and applying the at least one filter to the reconstructed block.

In some aspects, the at least one filter in the method, non-transitory computer-readable medium, and apparatuses described above can include an adaptive loop filter. Moreover, in some examples, the clipping values can include a first set of clipping values for the luma component and a second set of clipping values for the chroma component, wherein the first set of clipping values for the luma component and the second set of clipping values for chroma component are both determined by left shifting the first integer by the second integer.

In some cases, the first integer is 1, and left shifting the first integer by the second integer can include raising 2 to a power of an exponent including the second integer.

In some aspects, the clipping values can correspond to a set of filter clipping values in a clipping index table, and different filter clipping values of the set of filter clipping values in the clipping index table can correspond to different positions within the picture.

In some examples, the offset value can include a predetermined offset value from a plurality of predetermined offset values, and the offset value can be determined from the plurality of predetermined offset values based on the clipping index value.

In some aspects, determining the clipping values for the at least one filter can include determining corresponding clipping values for a plurality of samples from the picture, wherein each corresponding clipping value is associated with a particular sample from the plurality of samples, and wherein each corresponding clipping value is determined by left shifting the first integer by a particular integer associated with the particular sample. In some examples, the particular integer can include a particular result of the bit depth value for the particular sample minus a particular offset value from the plurality of predetermined offset values. In some cases, the particular offset value can be determined from the plurality of predetermined offset values based on a particular clipping index value associated with the particular sample.

In some aspects, the clipping values for the at least one filter can include one or more luma clipping values for the luma component and one or more chroma clipping values for the chroma component, wherein the one or more luma clipping values are determined by left shifting the first integer by a third integer, the third integer including a second result of the bit depth value for a luma sample from the picture minus a luma offset value associated with a second clipping index value, and wherein the one or more chroma clipping values are determined by left shifting the first integer by a fourth integer, the fourth integer including a third result of the bit depth value for a chroma sample from the picture minus a chroma offset value associated with a third clipping index value.

In some cases, the at least one filter can include a 5×5 adaptive loop filter and a 7×7 adaptive loop filter, and applying the at least one filter to the reconstructed block can include applying the 5×5 adaptive loop filter to the chroma component and applying the 7×7 adaptive loop filter to the luma component.

In some cases, determining the clipping values for the at least one filter can include determining filter coefficient values for the at least one filter.

In some aspects, the method, non-transitory computer-readable medium, and apparatuses described above can include generating the encoded video bitstream including the one or more pictures. In some examples, the encoded video bitstream can be generated based on the video data and a result of applying the at least one filter to the block. In some cases, the method, non-transitory computer-readable medium, and apparatuses described above can include sending the encoded video bitstream to a decoding device, the encoded video bitstream being sent with signaling information, the signaling information including the offset value, the clipping index value, filter parameters, and/or an adaptive loop filter flag. In some aspects, the method, non-transitory computer-readable medium, and apparatuses described above can include storing the encoded video bitstream.

In some aspects, the method, non-transitory computer-readable medium, and apparatuses described above can include obtaining an encoded video bitstream including the one or more pictures; identifying signaling information associated with the encoded video bitstream, the signaling information including the offset value, the clipping index value, filter parameters, and/or an adaptive loop filter flag; and decoding the block from the encoded video bitstream.

In some aspects, decoding the block of the picture from the encoded video bitstream can include reconstructing the block of the picture, and applying the at least one filter can include applying the at least one filter to the reconstructed block.

In some examples, the apparatuses described above can include one or more sensors. In some aspects, the apparatuses described above can include a mobile device. In some examples, the apparatuses described above can include a mobile phone, a wearable device, a display device, a mobile computer, a head-mounted device, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the disclosed and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 3A is a diagram illustrating an example of chroma filter configuration, in accordance with some examples of the present disclosure;

FIG. 3B is a diagram illustrating an example of luma filter configuration, in accordance with some examples of the present disclosure;

FIGS. 4B through 4D are diagrams illustrating example filters with different geometry transformations, in accordance with some examples of the present disclosure;

FIG. 5 illustrates an example table of clipping values derived based on simplified clipping value calculations, in accordance with some examples of the present disclosure;

DETAILED DESCRIPTION

Figure 1:
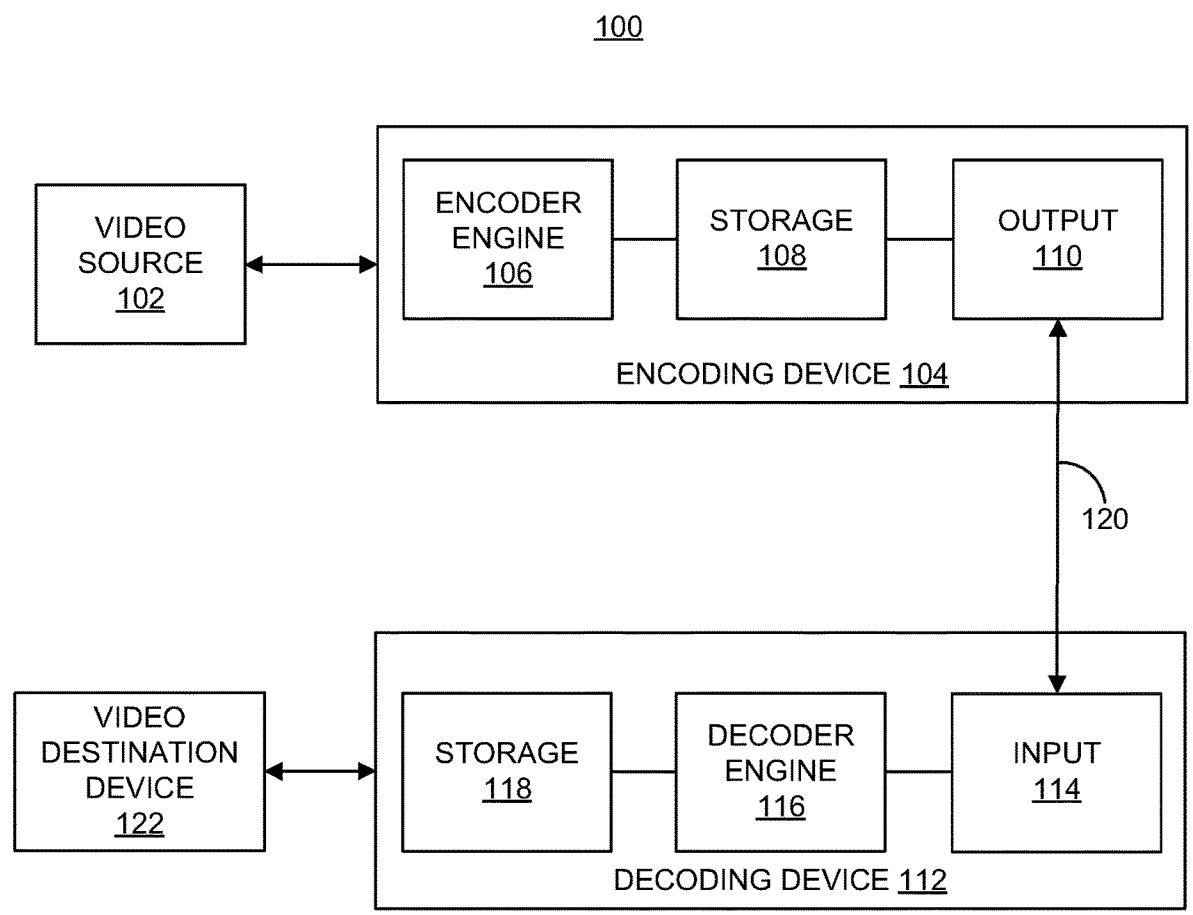
FIG. 1 is a block diagram illustrating an example of an encoding device and a decoding device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices can implement video compression techniques to encode and decode video data efficiently. Video compression techniques can include applying different prediction modes, including spatial prediction (e.g., intra-frame prediction or intra-prediction), temporal prediction (e.g., inter-frame prediction or inter-prediction), inter-layer prediction (across different layers of video data and/or other prediction techniques to reduce or remove redundancy inherent in video sequences), among others. A video encoder can partition each picture of an original video sequence into rectangular regions referred to as video blocks or coding units and described in greater detail below. These video blocks can be encoded using a particular prediction mode.

In some cases, video blocks can be divided in one or more ways into one or more groups of smaller blocks. Blocks can include coding tree blocks, prediction blocks, transform blocks, and/or other suitable blocks. References generally to a "block", unless otherwise specified, may refer to such video blocks (e.g., coding tree blocks, coding blocks, prediction blocks, transform blocks, or other appropriate blocks or sub-blocks, as would be understood by one of ordinary skill). These blocks may also interchangeably be referred to herein as "units" (e.g., coding tree unit (CTU), coding unit (CU), prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder can restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder can determine a prediction error. In some examples, the prediction can be determined as the difference between the pixel values in the block being encoded and the predicted block. The prediction error can also be referred to as the residual. The video encoder can also apply a transform to the prediction error (e.g., a discrete cosine transform (DCT) or other suitable transform) to generate transform coefficients. After transformation, the video encoder can quantize the transform coefficients. The quantized transform coefficients and motion vectors can be represented using syntax elements and, along with control information, form a coded representation of a video sequence. In some instances, the video encoder can entropy code syntax elements, thereby further reducing the number of bits used for their representation.

A video decoder can, using the syntax elements and control information discussed above, construct predictive data (e.g., a predictive block) for decoding a current frame. For example, the video decoder can add the predicted block and the compressed prediction error. The video decoder can determine the compressed prediction error by weighting the transform basis functions using the quantized coefficients. The difference between the reconstructed frame and the original frame is called reconstruction error.

In some cases, an adaptive loop filter with clipping can be applied to enhance the quality of a reconstructed frame. Clipping is an image processing technique that can be used to process an image and/or improve a quality of an image or frame when the intensity or brightness in one or more areas of the image or frame falls outside of the minimum or maximum intensity or brightness that can be represented. For example, clipping can be used to adjust the intensity or brightness values for such areas of the image or frame to at or within the minimum or maximum values that can be represented.

The techniques described herein can simplify and increase the efficiency of clipping value calculations for adaptive loop filters used in video coding. In some examples, the techniques herein can decrease the complexity of such calculations, reduce decoding errors, and minimize the processing burden on a device's compute resources. Moreover, the techniques described herein can be applied to any video codecs (e.g., High Efficiency Video Coding (HEVC), Advanced Video Coding (AVC), or other suitable existing video codec), and/or can be an efficient coding tool for any video coding standards, including current video coding standards, video standards being developed, and/or future video coding standards, such as, for example, Versatile Video Coding (VVC), the joint exploration model (JEM), and/or other video coding standards in development or to be developed.

FIG. 1 is a block diagram illustrating an example system 100 including an encoding device 104 and a decoding device 112. The encoding device 104 can be part of a source device, and the decoding device 112 can be part of a receiving device. The source device and/or the receiving device can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a head-mounted display (HMD), and/or any other suitable electronic device. In some examples, the source device and the receiving device can include one or more wireless transceivers for wireless communications. The coding techniques described herein can apply to video coding in various multimedia applications including, for example, streaming video transmissions (e.g., over the Internet), television broadcasts or transmissions, encoding of digital video for storage on a data storage medium, decoding of digital video stored on a data storage medium, and/or other applications. In some examples, system 100 can support one-way or two-way video transmission to support applications such as video conferencing, video streaming, video playback, video broadcasting, gaming, video telephony, etc.

The encoding device 104 (or encoder) can be used to encode video data using a video coding standard or protocol to generate an encoded video bitstream. Examples of video coding standards include ITU-T H.261; ISO/IEC MPEG-1 Visual; ITU-T H.262 or ISO/IEC MPEG-2 Visual; ITU-T H.263, ISO/IEC MPEG-4 Visual; ITU-T H.264 (also known as ISO/IEC MPEG-4 AVC), including its Scalable Video Coding (SVC) and Multiview Video Coding (MVC) extensions; and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others).

Various aspects described herein provide examples using the VTM, VVC, HEVC, and/or extensions thereof. However, the techniques and systems described herein can also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 can provide the video data to the encoding device 104. The video source 102 can be part of the source device, or can be part of a device other than the source device. The video source 102 can include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 can include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture can include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRas1OutputFlag) equal to 1. Otherwise, a random access point picture (with RASL flag equal to 0) does not start a CVS.

An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units can contain a sequence of bits forming a coded representation of the video data (e.g., an encoded video bitstream, a CVS of a bitstream, or the like), such as coded representations of pictures in a video. The encoder engine 106 can generate coded representations of pictures by partitioning each picture into multiple slices. A slice can be independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and, in some cases, can be square in shape. For example, a size of a CU can include 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs can be partitioned to be non-square in shape. Syntax data associated with a CU can also describe, for example, partitioning of the CU into one or more TUs according to a CTU. A TU can be square or non-square in shape.

According to the HEVC standard, transformations can be performed using transform units (TUs). TUs may vary for different CUs. The TUs can be sized based on the size of PUs within a given CU. The TUs may be the same size or smaller than the PUs. In some examples, residual samples corresponding to a CU can be subdivided into smaller units using a quadtree structure known as residual quad tree (RQT). Leaf nodes of the RQT may correspond to TUs. Pixel difference values associated with the TUs can be transformed to produce transform coefficients. The transform coefficients can then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode can include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction can be made, for example, at the CU level.

The encoder engine 106 and decoder engine 116 (described in more detail below) can be configured to operate according to VVC. In VVC, a video coder (such as encoder engine 106 and/or decoder engine 116) can partition a picture into a plurality of coding tree units (CTUs). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks can be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x, \Delta y$), with $\Delta x$ specifying the horizontal displacement and $\Delta y$ specifying the vertical displacement of the reference block relative to the position of the current block. In some cases, a motion vector ($\Delta x, \Delta y$) can be in integer sample accuracy (also referred to as integer accuracy), in which case the motion vector points to the integer-pel grid (or integer-pixel sampling grid) of the reference frame. In some cases, a motion vector ($\Delta x, \Delta y$) can be of fractional sample accuracy (also referred to as fractional-pel accuracy or non-integer accuracy) to more accurately capture the movement of the underlying object, without being restricted to the integer-pel grid of the reference frame.

Accuracy of motion vectors can be expressed by the quantization level of the motion vectors. For example, the quantization level can be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0, y_0, \text{refIdx}_0$ and $\Delta x_1, y_1, \text{refIdx}_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0, y_0, \text{refIdx}_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 can then perform transformation and quantization. For example, following prediction, the encoder engine 106 can calculate residual values corresponding to the PU. Residual values can include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block can be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which can be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) can be applied to residual data in each CU. In some examples, a TU can be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 can calculate residual data for the TUs of the CU. The PUs can include pixel data in the spatial domain (or pixel domain). The TUs can include coefficients in the transform domain following application of a block transform. As previously noted, the residual data may correspond to pixel difference values between pixels of the unencoded picture and prediction values corresponding to the PUs. Encoder engine 106 can form the TUs including the residual data for the CU, and can then transform the TUs to produce transform coefficients for the CU.

The encoder engine 106 can perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream can then be entropy encoded by the encoder engine 106. In some examples, the encoder engine 106 can utilize a predefined scan order to scan the quantized transform coefficients to produce a serialized vector that can be entropy encoded. In some examples, encoder engine 106 can perform an adaptive scan. After scanning the quantized transform coefficients to form a vector (e.g., a one-dimensional vector), the encoder engine 106 can entropy encode the vector. For example, the encoder engine 106 can use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 can send the NAL units making up the encoded video bitstream data over the communications link 120 to the decoding device 112 of the receiving device. The input 114 of the decoding device 112 can receive the NAL units. The communications link 120 can include a channel provided by a wireless network, a wired network, or a combination of a wired and wireless networks. A wireless network can include any wireless interface or combination of wireless interfaces and can include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network can include any wired interface (e.g., fiber, ethernet, powerline ethernet, ethernet over coaxial cable, digital signal line (DSL), or the like). The wired and/or wireless networks can be implemented using various equipment and/or components, such as base stations, routers, access points, bridges, gateways, switches, servers, software containers, virtual machines, or the like. The encoded video bitstream data can be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, one or more nodes in a distributed storage system, or any other suitable digital storage media for storing encoded video data.

The input 114 of the decoding device 112 receives the encoded video bitstream data and can provide the video bitstream data to the decoder engine 116, or to storage 118 for later use by the decoder engine 116. The decoder engine 116 can decode the encoded video bitstream data by entropy decoding (e.g., using an entropy decoder) and extracting the elements of one or more coded video sequences making up the encoded video data. The decoder engine 116 can rescale and perform an inverse transform on the encoded video bitstream data. Residual data is passed to a prediction stage of the decoder engine 116. The decoder engine 116 then predicts a block of pixels (e.g., a PU). In some examples, the prediction is added to the output of the inverse transform (the residual data).

The decoding device 112 can output the decoded video to a video destination device 122, which can include a display or other output device for displaying the decoded video data. In some aspects, the video destination device 122 can be part of the receiving device that includes the decoding device 112. In some aspects, the video destination device 122 can be part of a separate device other than the receiving device.

In some examples, the video encoding device 104 and/or the video decoding device 112 can be integrated with an audio encoding device and audio decoding device, respectively. The video encoding device 104 and/or the video decoding device 112 can also include other hardware or software used to implement the coding techniques described herein, such as one or more microprocessors, digital signal processors (DSPs), application-specific integrated circuits (ASICs), field programmable gate arrays (FPGAs), central processing units (CPUs), discrete logic, software, hardware, firmware or any combinations thereof. In some cases, the video encoding device 104 and the video decoding device 112 can be integrated as part of a combined encoder/decoder (codec) in a respective device. An example of specific details of the encoding device 104 is described below with reference to FIG. 7. An example of specific details of the decoding device 112 is described below with reference to FIG. 8.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . , n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

In the field of video coding, filtering can be applied in order to enhance the quality of a decoded video signal. The filter can be applied as a post-filter, where a filtered frame is not used for prediction of future frames, or can be applied as an in-loop filter, where a filtered frame is used to predict future frame. A filter can be designed, for example, by minimizing the error between the original signal and the decoded filtered signal. In some examples, an adaptive loop filter (ALF) with clipping can be applied to enhance the quality of a decoded video signal, as further described below. Clipping is an image processing technique that can be used to process an image and/or improve a quality of an image where the intensity or brightness in one or more areas of the image falls outside of the minimum or maximum intensity or brightness that can be represented.

In some examples, clipping can adjust the intensity or brightness values for such areas of the image to the minimum or maximum values (or to within the minimum and maximum values) that can be represented. For instance, if a certain area of an image has intensity values that fall below a minimum intensity that can be represented, the image can be clipped to increase the intensity values for that area of the image to the minimum intensity value (or to not fall below the minimum intensity value), and if a certain area of an image has intensity values that exceed the maximum intensity that can be represented, the image can be clipped to reduce the intensity values for that area of the image to the maximum intensity value (or to fall below the maximum intensity value). Example techniques for calculating clipping values for an image are further described below.

Figure 2A:
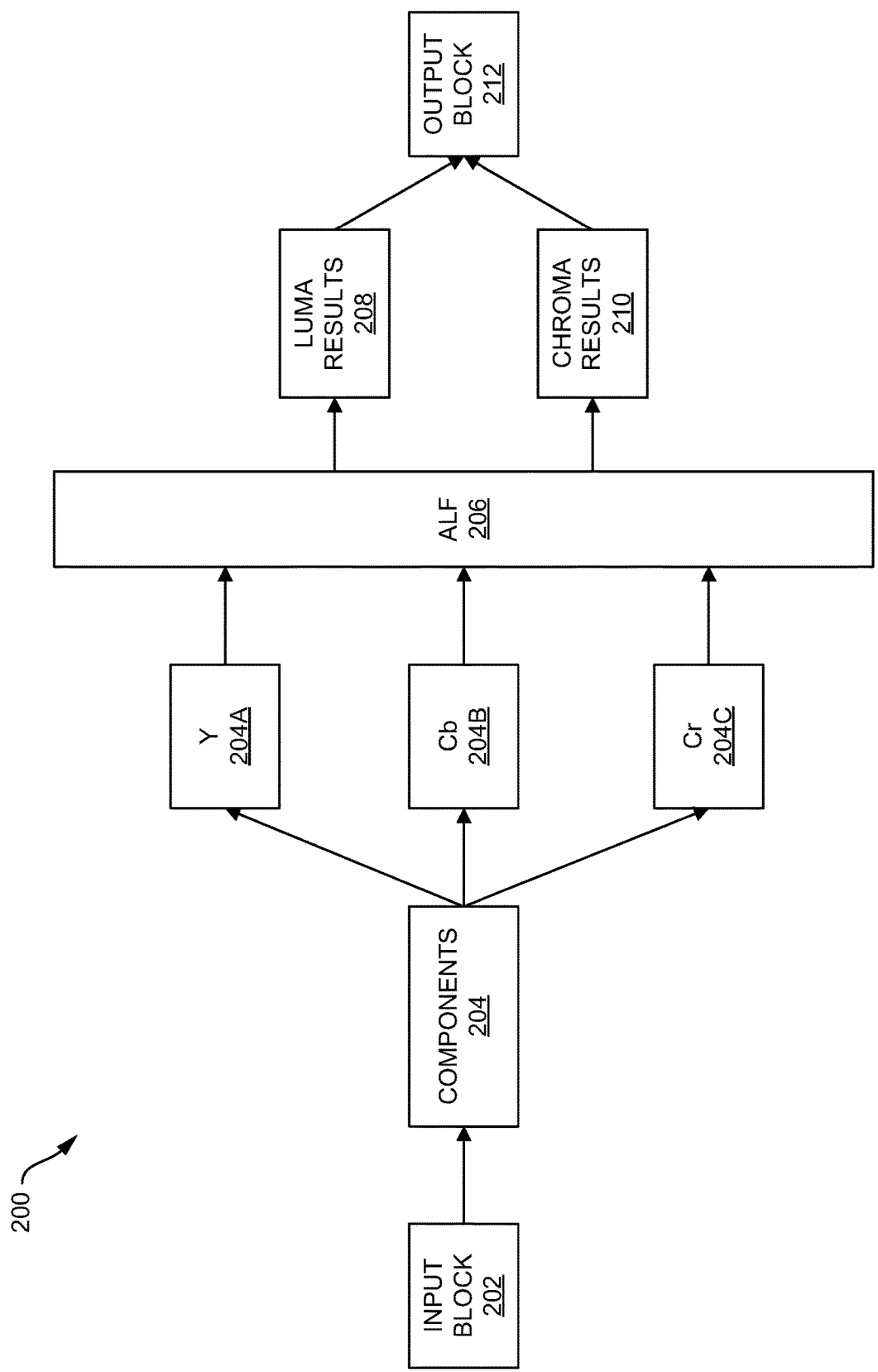
FIG. 2A is a simplified diagram illustrating an example system for applying an adaptive loop filter (ALF) with clipping to an input frame, in accordance with some examples of the present disclosure.

FIG. 2A is a simplified diagram illustrating an example system 200 for applying an ALF 206 with clipping to an input block 202 in a frame. The block 202 can include color components 204 for image pixels representing the block 202. In this example, the color components 204 are in the YCbCr color space and can include luma Y, chroma Cb, and chroma Cr components. The chroma Cb and chroma Cr components in the YCbCr color space can respectively represent the blue-difference and red-difference chroma signals associated with the block 202.

An ALF 206 with ALF filter coefficient values and clipping values can be applied to luma (Y) component samples 204A, chroma (Cb) component samples 204B, and chroma (Cr) component samples 204C in the block 202. In some examples, the ALF 206 with the ALF filter coefficient values and the clipping values can be applied to samples (e.g., 204A, 204B, 204C) on a block-by-block basis (e.g., to specific video blocks). For example, the video encoder or decoder can process blocks in a frame individually and, when processing a block (e.g., 202) in the frame, the video encoder or decoder can apply ALF filter coefficient and clipping values from the ALF 206 to that block. The video encoder or decoder can similarly apply ALF filter coefficient and clipping values to other blocks as it processes those blocks. In some examples, the ALF 206 with clipping can be applied to the luma (Y) component samples 204A, the chroma (Cb) component samples 204B, and the chroma (Cr) component samples 204C to correct artifacts in the block 202, reduce the error between the original frame and the reconstructed frame, and/or increase the quality of the decoded video signal.

Moreover, the ALF 206 can include one or more filters, and each filter can have a specific filter size and shape, as further described below with respect to FIGS. 3A and 3B.

For example, the ALF 206 can include a filter of a certain size and shape used for luma (Y) filtering and a filter of a certain size and shape for chroma filtering. As previously explained, in some examples, the ALF 206 can be applied at the block level. For example, in some cases, the ALF 206 can be applied at the CTU or CU level. In other examples, the ALF 206 can be applied at a frame level and/or to other portions of a frame.

A luma filtering result 208 can be obtained from the ALF 206 applied to the luma (Y) component samples 204A. Similarly, a chroma filtering result 210 can be obtained from the ALF 206 applied to the chroma (Cb) component samples 204B and the chroma (Cr) component samples 204C. The luma filtering result 208 can include filtered (e.g., modified and/or clipped) luma values for the output block 212, and the chroma filtering result 210 can include filtered chroma Cb and chroma Cr values for the output block 212. The output block 212 can include a reconstructed block and/or frame including the luma, chroma Cb and chroma Cr values from the luma filtering result 208 and the chroma filtering result 210. In some cases, the output block 212 along with other output blocks similarly processed can be used to generate a reconstructed frame with ALF filtering and clipping.

In some examples, at the encoder side, the luma filtering result 208 and the chroma filtering result 210 can be used to determine whether luma and chroma ALF filtering should be enabled. For example, the quality of the reconstructed block and/or frame after ALF filtering can be compared with the quality of the reconstructed block and/or frame before ALF filtering. ALF filtering can then be enabled or disabled based on the quality of the reconstructed block and/or frame after ALF filtering relative to the quality of the reconstructed block and/or frame before ALF filtering. An ALF flag can then be signaled with the encoded bitstream to indicate whether ALF filtering is enabled or disabled for the block. In some cases, the ALF flag can specify whether luma ALF filtering is enable or disabled, whether luma and chroma ALF filtering are enabled or disabled, or whether ALF filtering is disabled altogether. At the decoder side, the decoder can use the ALF flag to determine whether to perform ALF filtering for the block in the reconstructed image and/or the reconstructed image.

Figure 2B:
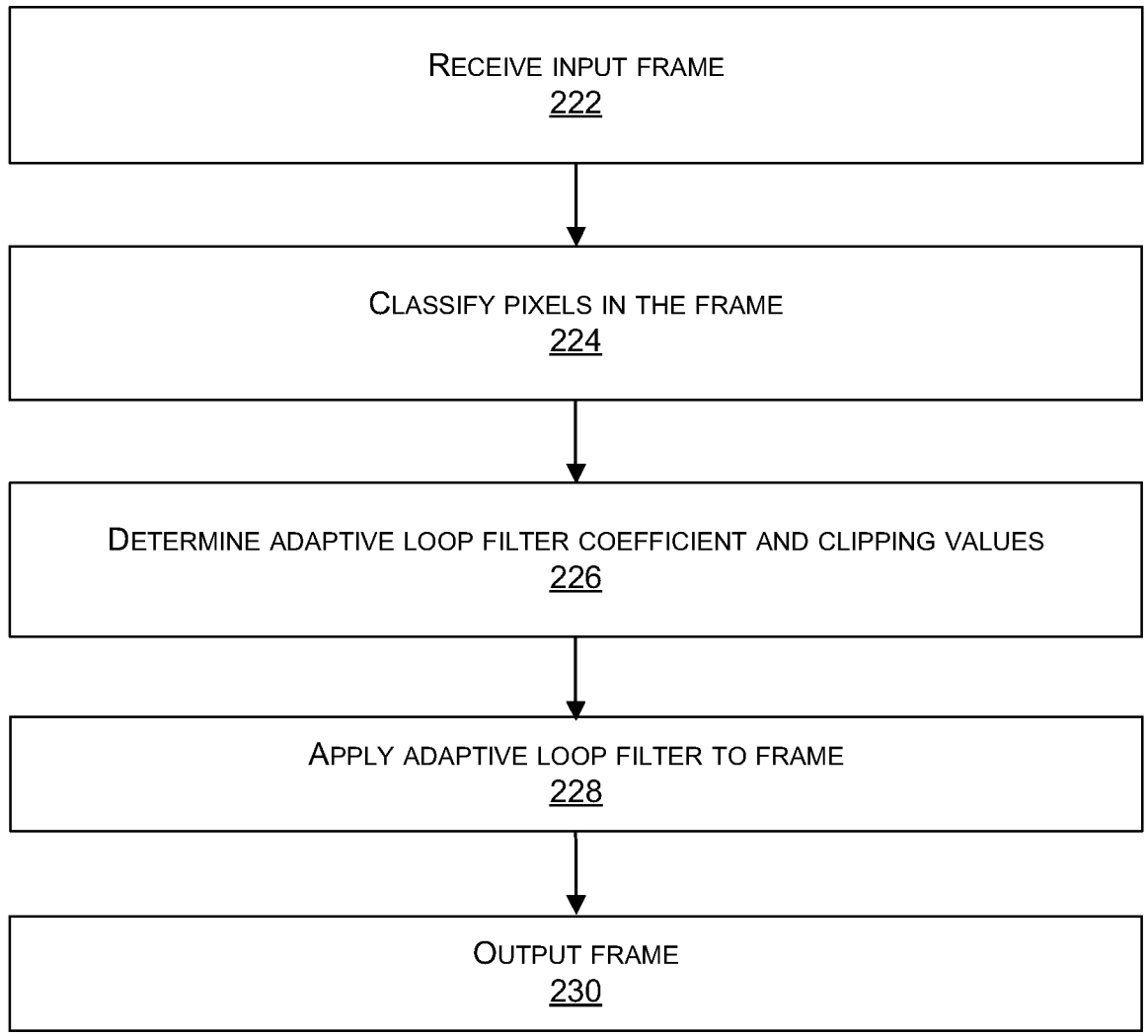
FIG. 2B is a flowchart of an example method for ALF filtering with clipping implemented by an encoding device, in accordance with some examples of the present disclosure.

FIG. 2B is a flowchart of an example method 220 for ALF filtering with clipping implemented by an encoding device 104. In this example, at block 222, the encoding device 104 can receive an input frame. The input frame can include color components, such as luma and chroma components, as previously explained. In some examples, the input frame can include blocks in a frame encoded by the encoding device 104 prior to the ALF filtering. In some examples, the input frame can be a frame associated with an image and/or a video sequence.

At block 224, the encoding device 104 can classify luma components in the frame. In some examples, the encoding device 104 can also classify chroma components in the frame. The classification can be applied to a luma component at a block level (e.g., at a 4×4 block level) or at a sample level (for each sample of the frame). In some cases, the classification can include classifying the direction and activity for each block or sample associated with each luma component in the frame. In some examples, for the luma component, 4×4 blocks in the whole frame, where N represents a number greater than 0, can be classified based on a 1D Laplacian direction (e.g., up to 5 directions) and 2D Laplacian activity (e.g., up to 5 activity values). In some cases, the encoding device 104 can calculate a direction $Dir_b$ and an unquanitzed activity $Act_b$. In some cases, $Act_b$ can be further quantized to a range of 0 to 4, inclusively.

In some cases, values of two diagonal gradients, in addition to the horizontal and vertical gradients used in an existing ALF, can be calculated using a 1D Laplacian. As it can be seen from Equations (1) to (4) below, the sum of gradients of all pixels within an 8×8 window that covers a target pixel can be employed as the represented gradient of the target pixel, where R(k,l) is the reconstructed pixel(s) at location (k,l) and indices i and j refer to the coordinates of the upper-left pixel in the 4×4 block (e.g., from the 4×4 blocks in the frame). Each pixel is associated with four gradient values, with a vertical gradient denoted by $g_v$, a horizontal gradient denoted by $g_h$, a 135 degree diagonal gradient denoted by $g_{d1}$, and a 45 degree diagonal gradient denoted by $g_{d2}$.

$$g_v = \sum_{k=i-2}^{i+3} \sum_{l=j-2}^{j+3} V_{k,l},$$

$$V_{k,l} = |2R(k, l) - R(k, l-1) - R(k, l+1)|$$

Equation (1)

$$g_h = \sum_{k=i-2}^{i+3} \sum_{l=j-2}^{j+3} H_{k,l},$$

$$H_{k,l} = |2R(k, l) - R(k-1, l) - R(k+1, l)|$$

Equation (2)

$$g_{d1} = \sum_{k=i-2}^{i+3} \sum_{l=j-3}^{j+3} D1_{k,l},$$

$$D1_{k,l} = |2R(k, l) - R(k-1, l-1) - R(k+1, l+1)|$$

Equation (3)

$$g_{d2} = \sum_{k=i-2}^{i+3} \sum_{j=j-2}^{j+3} D2_{k,l},$$

$$D2_{k,l} = |2R(k, l) - R(k-1, l+1) - R(k+1, l-1)|$$

Equation (4)

To assign the directionality $Dir_b$, the ratio of the maximum and minimum of the horizontal and vertical gradients, denoted by $R_{h,v}$ in Equation (5) below, and the ratio of the maximum and minimum of two diagonal gradients, denoted by $R_{d0,d1}$ in Equation (6) (can also be denoted as $R_{d1,d2}$ in some cases), are compared against each other with two thresholds $t_1$ and $t_2$.

$$R_{h,v} = g_{h,v}^{max}/g_{h,v}^{min}$$

wherein $g_{h,v}^{max} = \max(g_h, g_v), g_{h,v}^{min} = \min(g_h, g_v),$  Equation (5)

$$R_{d0,d1} = g_{d0,d1}^{max}/g_{d0,d1}^{min}$$

wherein $g_{d0,d1}^{max} = \max(g_{d0}, g_{d1}), g_{d0,d1}^{min} = \min(g_{d0}, g_{d1})$  Equation (6)

By comparing the detected ratios of the horizontal and vertical gradients and the diagonal gradients, five direction modes (e.g., $Dir_b$ within the range of [0, 4] inclusive), are defined in Equation (7) below. The values of $Dir_b$ and its physical meaning are described in Table 1 below.

$$D = \begin{cases} 0 & R_{h,v} \leq t_1 \ \&\& \ R_{d0,d1} \leq t_1 \\ 1 & R_{h,v} > t_1 \ \&\& \ R_{h,v} > R_{d0,d1} \ \&\& \ R_{h,v} > t_2 \\ 2 & R_{h,v} > t_1 \ \&\& \ R_{h,v} > R_{d0,d1} \ \&\& \ R_{h,v} \leq t_2 \\ 3 & R_{d0,d1} > t_1 \ \&\& \ R_{h,v} \leq R_{d0,d1} \ \&\& \ R_{d0,d1} > t_2 \\ 4 & R_{d0,d1} > t_1 \ \&\& \ R_{h,v} \leq R_{d0,d1} \ \&\& \ R_{d0,d1} \leq t_2 \end{cases}$$  Equation (7)

TABLE 1

Values of Direction and Its Physical Meaning

| Direction Values | Physical Meaning |
| --- | --- |
| 0 | Texture |
| 1 | Strong Horizontal/Vertical |
| 2 | Horizontal/Vertical |
| 3 | Strong Diagonal |
| 4 | Diagonal |

The activity value Act can be calculated as:

$$\text{Act} = \sum_{k=i-3}^{i+4} \sum_{l=j-3}^{j+4} (V_{k,l} + H_{k,l}). \quad \text{Equation (8)}$$

In some cases, the Act value can be further quantized to the range of 0 to 4 inclusive, and the quantized value is denoted as Â. The quantization process from activity value Act to activity index Â is described below.

The quantization process can be defined as follows:

avg_var=Clip_post(NUM_ENTRY−1,
 (Act*ScaleFactor)>>shift);

$$\hat{A} = \text{ActivityToIndex}[avg\_var], \quad \text{Equation (9)}$$

where NUM_ENTRY is set to 16 (or other suitable value), ScaleFactor is set to 64 (or other suitable value), shift is (4+internal coded-bitdepth) or other suitable value, ActivityToIndex[NUM_ENTRY]={0, 1, 2, 2, 2, 2, 2, 3, 3, 3, 3, 3, 3, 3, 3, 4} or other suitable set of values, and function Clip_post(a, b) returns the smaller value between a and b.

In total, each 4×4 luma block can be categorized into one out of 25 (5×5) classes and an index is assigned to each 4×4 block according the value of $Dir_b$ and $Act_b$ of the block. The group index can be denoted as C and can be set equal to $5Dir_b+\hat{A}$, where Â is the quantized value of $Act_b$.

At block 226, the encoding device 104 can determine ALF coefficient and clipping values for the ALF, and at block 228, the encoding device 104 can apply the ALF filter to the frame. In some examples, the ALF filter shapes can determine the number of coefficients that will influence the filtering process. Non-limiting example filter shapes can include 5×5, 7×7, and 9×9 diamond shapes. FIGS. 3A and 3B illustrate example ALF filters that can be applied for chroma and luma filtering.

With reference to FIG. 3A, an example filter 300 for chroma filtering is shown. The filter 300 in this example is a 5×5 filter and has a diamond shape. The filter 300 includes cells 302 through 326 for 13 input chroma samples. The cells 302 through 326 include coefficient and clipping values (e.g., C0 through C6) to be applied to corresponding chroma samples. Each cell (302 through 326) can include a filter coefficient value and a clipping value that is applied to a chroma sample associated with that cell.

With reference to FIG. 3B, an example filter 330 for luma filtering is shown. The filter 330 in this example is a 7×7 filter and has a diamond shape. The filter 330 includes cells 332 through 380 for 25 input luma samples. The cells 332 through 380 include coefficient and clipping values (e.g., C0 through C12) to be applied to corresponding luma samples. Each cell (332 through 380) can include a filter coefficient value and a clipping value that is applied to a luma sample associated with that cell.

Returning to FIG. 2A, in some examples, the decoded filter coefficients f(k,l) corresponding to the coefficients at positions k and l, and the clipping values c(k,l), corresponding to the clipping values at positions k and l, can be applied to the reconstructed image R(i,j) as follows:

$$\tilde{R}(i, j) = R(i, j) + \sum_{k,l=(-K,-K), k,l \neq (0,0)}^{K,K} f(k, l) * \quad \text{Equation (10)}$$

$$\text{clip3}(-c(k, l), (k, l), R(i + k, j + l) - R(i, j))$$

In some examples, a 5×5 filter, such as filter 300 shown in FIG. 3A can be applied to chroma components, and a 7×7 filter, such as filter 330 shown in FIG. 3B, can be applied to the luma component. The output values of Equation (10) can define the values applied to the center of the filter.

For example, with reference to FIG. 3A, each cell (302 through 326) in the filter 300 can have a filter coefficient f(k,l) and a clipping value c(k,l), and each of these values in the cell can be applied to a corresponding pixel. In some cases, the center of the filter 300 (e.g., cell 314), represented by $\tilde{R}(i,j)$ in Equation (10), can be placed on or applied to a pixel and the remaining cells (e.g., cells 302-312 and 316-326) of the filter 300 can be placed on or applied to surrounding or neighboring pixels.

Moreover, with reference to FIG. 3B, each cell (332 through 380) in the filter 330 can have a filter coefficient f(k,l) and a clipping value c(k,l), and each of these values in the cell can be applied to a corresponding pixel. In some cases, the center of the filter 330 (e.g., cell 356), represented by $\tilde{R}(i,j)$ in Equation (10), can be placed on or applied to a pixel and the remaining cells (e.g., cells 332-354 and 358-380) of the filter 330 can be placed on or applied to surrounding or neighboring pixels.

Returning to FIG. 2A, in Equation (10), $\tilde{R}(i,j)$ can be calculated by adding the current sample R(i,j) (e.g., luma sample, chroma sample) of the frame to the sum of the filter coefficient times the clipped difference (e.g., sum(filter coefficient*clipped difference) or $\Sigma_{k,l=(-K,-K), k,l \neq (0,0)}^{K,K}(f(k,l)$ *clip3(−c(k,l),c(k,l),R(i+k,j+l)−R(i,j)))), which can be the difference between the neighbor sample R(i+k,j+1) and the current sample R(i,j). The output of Equation (10) can define a range of values for clipping. In some cases, a value can be selected from the range of values. In some examples, the selected value can be the highest value in the range of values that falls within the minimum and maximum values that can be represented in the frame. Moreover, the selected value can provide a pixel value to use for the sample.

In some cases, the clipping value c(k,l) can be calculated as follows. For a luma component, the clipping value c(k,l) can be calculated as follows:

$$c(k,l) = \text{Round}(2^{(BitDepthY*(4-clipIdx(k,l))/4)}), \quad \text{Equation (11)}$$

where BitDepthY is the bit depth (e.g., the color depth) for the luma component and clipIdx(k,l) is the clipping value(s) at position (k,l). In some cases, clipIdx(k,l) can be 0, 1, 2 or 3.

For a chroma component, the clipping value c(k,l) can be calculated as follows:

$$c(k,l) = \text{Round}(2^{(BitDepthC-8)} * 2^{(8*(3-clipIdx[k,l])/3)}), \quad \text{Equation (12)}$$

where BitDepthC is the bit depth for a chroma component and clipIdx(k,l) is the clipping value(s) at position (k,l). In some cases, clipIdx(k,l) can be 0, 1, 2 or 3.

At block 230, the encoding device 104 can generate an output frame. The output frame can include a reconstructed image after the ALF filtering. The output frame can include pixel values for luma and chroma components, calculated based on the filter coefficients and the clipping values, as previously explained.

In some examples, the pixel values generated for samples by the ALF filtering method 220 can be compared with the pixel values of the original samples to determine whether luma and chroma filtering should be enabled. For example, if the luma filtering results provide better image quality than the original luma samples, the encoding device 104 can enable luma filtering for the frame. If the chroma filtering results provide better image quality than the original chroma samples, the encoding device 104 can enable chroma filtering for the frame.

In some cases, the encoding device 104 can signal an ALF flag with an encoded bitstream. The signaled ALF flag can indicate to the decoding device (e.g., 112) whether ALF filtering is enabled or disabled for a particular frame.

In some cases, the method 220 can include performing geometry transformations. In some examples, one set of filter coefficients and clipping values can be signaled for each category from the pixel classifications described at block 224. In some cases, to better distinguish different directions of blocks marked with the same category index, four geometry transformations, including no transformation, diagonal, vertical flip, and rotation, can be performed.

Figure 4A:
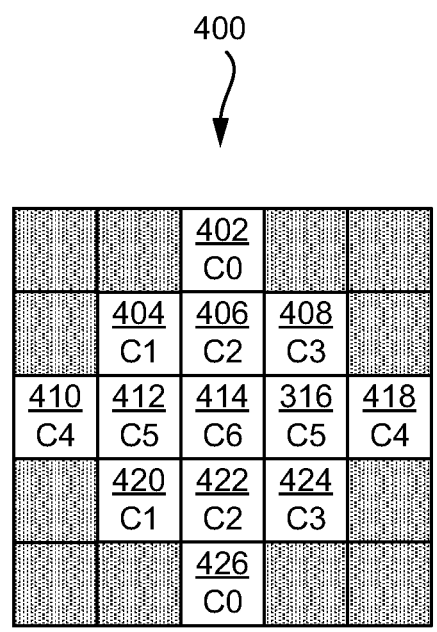
FIG. 4A is a diagram illustrating an example filter with no geometric transformation, in accordance with some examples of the present disclosure.

An example 5×5 filter 400 with no transformation with respect to cells 402-426 is shown in FIG. 4A, and an example 5×5 filter with diagonal transformation 430 with respect to cells 402-426, vertical flip transformation 440 with respect to cells 402-426, and rotation transformation 450 with respect to cells 402-426 are shown in FIGS. 4B-D. In particular, FIG. 4B illustrates an example of a diagonal geometry transformation 430, FIG. 4C illustrates an example of a vertical flip geometry transformation 440, and FIG. 4D illustrates an example of a rotation geometry transformation 450.

If the example 5×5 filter 400 with no transformation shown in FIG. 4A is compared to the diagonal geometry transformation 430 in FIG. 4B, the vertical flip geometry transformation 440 in FIG. 4C, and the rotation geometry transformation 450 in FIG. 4D, the following formula forms of the three additional geometry transformations (e.g., the diagonal geometry transformation 430, the vertical flip geometry transformation 440, and the rotation geometry transformation 450) can be obtained:

Diagonal: $f_D(k,l)=f(l,k)$, $c_D(k,l)=c(l,k)$,

Vertical flip: $f_V(k,l)=f(k,K-l-1)$, $c_V(k,l)=c(k,K-l-1)$

Rotation: $f_R(k,l)=f(K-l-1,k)$, $c_R(k,l)=c(K-l-1,k)$,   Equation (13)

where K is the size of the filter and $0 \le k, l \le K-1$ are coefficients coordinates, such that location (0,0) is at the upper-left corner and location (K-1,K-1) is at the lower-right corner. Note that when the diamond-shaped filter support is used, the coefficients with coordinate(s) out of the filter support can be set to 0. One way of indicating the geometry transformation index is to derive it implicitly to avoid additional overhead. In a geometry transformation-based ALF (GALF), the transformations can be applied to the filter coefficients f(k,l) depending on gradient values calculated for that block. The relationship between the transformation and the four gradients calculated using Equations (3)-(7) is described in Table 2 below.

TABLE 2

Mapping of Gradient and Transformations.

| Gradient Values | Transformation |
| --- | --- |
| $g_{d2} < g_{d1}$ and $g_h < g_v$ | No Transformation |
| $g_{d2} < g_{d1}$ and $g_v < g_h$ | Diagonal |
| $g_{d1} < g_{d2}$ and $g_h < g_v$ | Vertical Flip |
| $g_{d1} < g_{d2}$ and $g_v < g_h$ | Rotation |

The transformation(s) can be based on which one of two gradients (horizontal and vertical, or 45 degree and 135 degree gradients) is larger. Based on the comparison, more accurate direction information can be extracted. Therefore, different filtering results can be obtained due to transformation while the overhead of filter coefficients is not increased.

In some examples, filter information signaling can be provided with the encoded bitstream. For example, one luma filter set can contain filter information (e.g., including filter coefficients, clipping values, offset values, etc.) for all classes. Fixed filters can be used to predict the filters for each class. A flag can be signaled for each class to indicate whether the class uses a fixed filter as its filter predictor. If so, the fixed filter information can be signaled. In some examples, a signaled filter can be predicted from a previously signaled filter.

To reduce the number of bits used to represent the filter coefficients, different classes can be merged. The information regarding which classes are merged can be provided by sending, for each of the classes, an index $i_C$. Classes having the same index $i_C$ can share the same filter coefficients that are coded. The mapping between classes and filters can be signaled for each luma filter set. The index $i_C$ can be coded with a truncated binary binarization method.

In VTM-5.0, adaptive parameter sets (APSs) can be used to carry ALF filter coefficients in the bitstream. An APS can contain a set of luma filters or a chroma filter or both. A tile group only signals indices of APSs that are used for a current tile group in its tile group header.

A coding tree block (CTB)-based filter set switch can be implemented in some cases. In VTM-5.0, filters generated from previously-coded tile groups can be used for a current tile group to save the overhead for filter signaling. A luma CTB can choose a filter set among fixed filter sets and filter sets from APSs. The filter set index can be signaled in or with the bitstream. In some cases, some or all chroma CTBs use a filter from the same APS. In a tile group header, the APSs used for luma and chroma CTBs of a current tile group are signaled.

Returning to FIG. 2B, the output frame generated by the encoding device 104 can be transmitted to a decoding device 112 in an encoded bitstream. The encoded bitstream can include signaling information, as previously explained. The decoding device 112 can receive the encoded bitstream, decode the bitstream, and use the signaling information to apply ALF filtering and clipping for frames in the bitstream when such filtering is enabled.

Figure 2C:
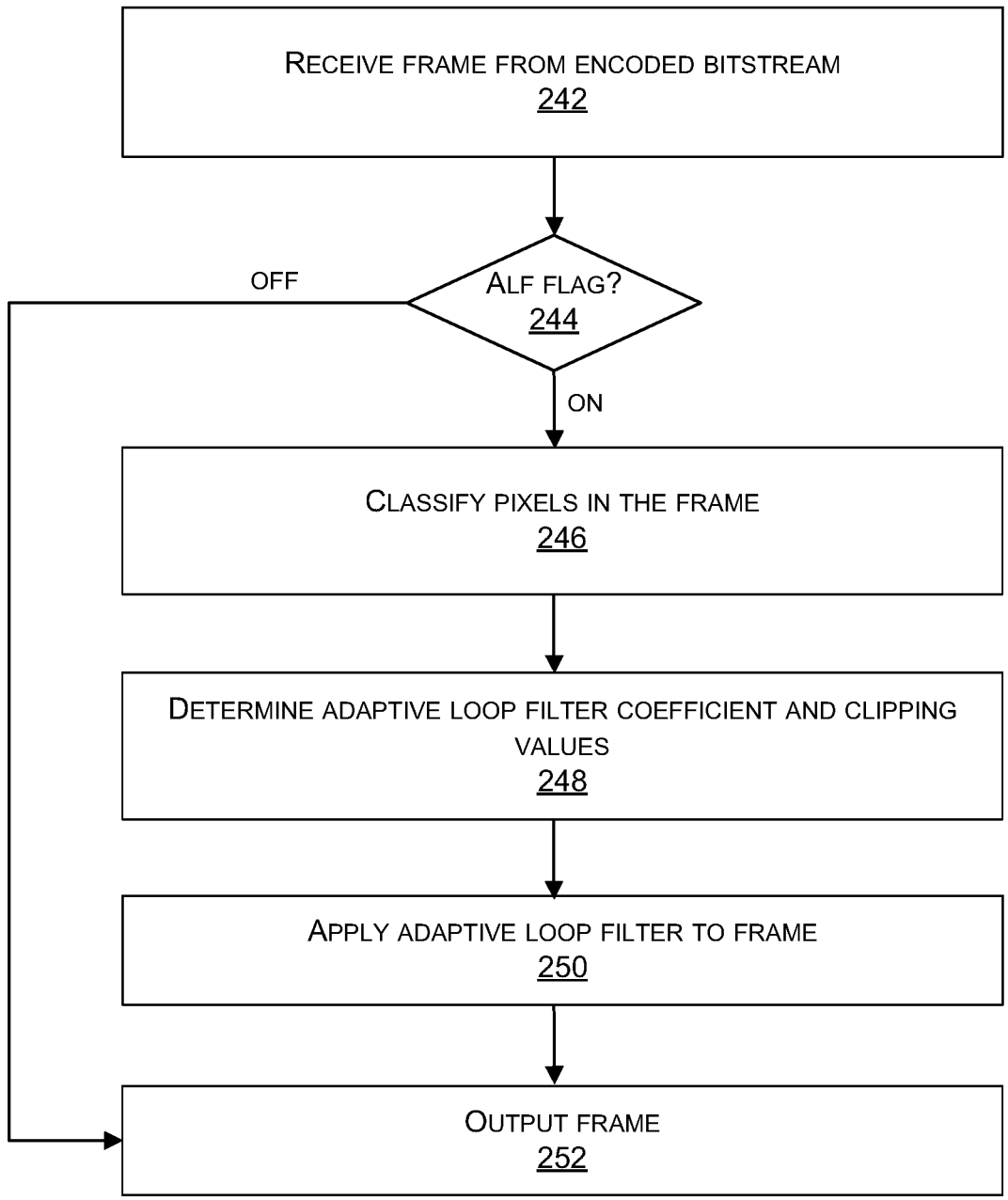
FIG. 2C is a flowchart illustrating an example method for ALF filtering with clipping implemented by the decoding device, in accordance with some examples of the present disclosure.

FIG. 2C is a flowchart illustrating an example method 240 for ALF filtering with clipping implemented by the decoding device 112. In this example, at block 242, the decoding device 112 can receive a frame from the encoded bitstream provided by the encoding device 104. In some cases, the frame can be a reconstructed or decoded frame from the encoded bitstream. Moreover, in some examples, the frame can include luma and chroma components, as previously explained.

At block 224, the decoding device 112 can determine if an ALF flag signaled with the frame is on or off. If the ALF flag is off, indicating the ALF filtering is disabled, the decoding device 112 can output the frame at block 252. On the other hand, if the ALF flag is on, indicating the ALF filtering is enabled, at block 246, the decoding device 246 can classify pixels in the frame. The decoding device 112 can classify pixels as previously described with respect to block 224 shown in FIG. 2B.

The ALF flag can indicate whether luma filtering is enabled (or disabled) or whether both luma filtering and chroma filtering is enabled (or disabled). If luma filtering is enabled, the ALF filtering performed by the decoding device 112 as described herein can include luma filtering. If luma and chroma filtering are both enabled, the ALF filtering performed by the decoding device 112 as described herein can include both luma and chroma filtering.

At block 248, the decoding device 112 can determine ALF coefficients and clipping values, and at block 250 the decoding device 112 can apply the ALF filter with the ALF coefficients and the clipping values to the frame. The decoding device 112 can determine and apply the ALF coefficients and clipping values as previously explained with respect to blocks 226 and 228 shown in FIG. 2B.

At block 252, the decoding device 112 can generate an output frame. If the ALF flag was off at block 244, the output frame can include a reconstructed image without the ALF filtering. If the ALF flag was on at block 244, the output frame can include a reconstructed image after the ALF filtering. The output frame can include pixel values for luma and chroma components, calculated based on the filter coefficients and the clipping values, as previously explained.

Various issues and disadvantages can arise when using floating-point arithmetic to calculate clipping values c(k,l). For example, the Equations (11) and (12) describe above for calculating clipping values c(k,l) often need to use floating-point arithmetic to perform such calculations. However, the floating-point arithmetic can increase the complexity of the computations (e.g., as a result of implementing decimal numbers), can increase the computational burden on the device's hardware and computing resources (e.g., as a result of the increased complexity), and can increase decoding errors (e.g., as a result of different architectures calculating floating-point numbers in different ways).

Accordingly, in some examples, various approaches can be implemented to simplify the calculation of clipping values for ALFs and increase the efficiency of such calculations. The simplified and increasingly efficient calculation of the clipping values for ALFs can decrease the complexity of the computations, reduce the computational burden on the device's hardware, and reduce the decoding error. Such approaches, as further described below, can be applied to any video codecs (current and/or future), such as HEVC and/or AVC, and/or any video coding standards, such as VVC and/or any future video coding standards.

In some cases, the techniques described herein can simplify the calculation of clipping values for a luma component, one or more chroma components, or both luma and chroma components. In some implementations, integer arithmetic can be used to calculate clipping values for luma and/or chroma components, and simplify such calculations.

FIG. 5 illustrates an example table 500 of clipping values derived based on simplified clipping value calculations as described herein. In this example, the clipping values in the table 500 are calculated using integer arithmetic. The integer arithmetic and techniques used here to calculate the clipping values in the table 500 can reduce the complexity of such calculations, minimize the computational burden on hardware and compute resources, and reduce decoding errors.

Table 500 includes a bit depth column 502 and a clipping index (clipIdx) column 522. The bit depth column 502 includes bit depth values 504-520, and the clipping index column 522 includes clipping index values 524-530. In this example, the bit depth values 504-520 range from 8 bits to 16 bits, and the clipping index values 524-530 range from 0 to 3. The bit depth values 504-520 can identify the number of bits used for each color component of a pixel and/or the color depth of a pixel (e.g., the number of bits used to indicate the color of a pixel). The clipping index values 524-530 indicate the clipping index of the clipping value to use for a sample or pixel. In this example, the clipping index values 524-530 include clipping index 0 (524), 1 (526), 2 (528), and 3 (530).

In some examples, the specific clipping index values used to calculate clipping values for a specific bitstream or frame can be signaled with the encoded bitstream or frame. Moreover, in some examples, the clipping index values 524-530 for a chroma component can be defined by alf_chroma_clip_idx[altIdx][j], which can specify the clipping index of the clipping value to use before multiplying by the j-th coefficient of the alternative chroma filter with index altIdx. In some examples, for bitstream conformance, the values of alf_chroma_clip_idx[altIdx][j] can range from 0 to 3; where altIdx=0, . . . , alf_chroma_num_alt_filters_minus1; j=0, . . . , 5; and alf_chroma_num_alt_filters_minus1 indicates the number of alternative chroma filters minus 1. In some examples, alf_chroma_num_alt_filters_minus1 can be in the range of 0 to 7.

In some examples, the clipping index values 524-530 for a luma component can be defined by alf_luma_clip_idx[alf_luma_coeff_delta_idx[filtIdx]][j], which can specify the clipping index of the clipping value to use before multiplying by the j-th coefficient of the luma signaled specified by alf_luma_coeff_delta_idx[filtIdx], where j=0, . . . , 11. In some examples, alf_luma_coeff_delta_idx[filtIdx] can specify the indices of the signaled ALF luma coefficient deltas for the filter class indicated by filtIdx, which can range from 0 to NumAlfFilters−1, where NumAlfFilters indicates a number of ALF filters. In some cases, when alf_luma_coeff_delta_idx[filtIdx] is not present, it can be inferred to be equal to 0. Moreover, in some cases, the length of alf_luma_coeff_delta_idx[filtIdx] can be Ceil(Log 2(alf_luma_num_filters_signalled_minus1+1)) bits, and the value of alf_luma_coeff_delta_idx[filtIdx] can be in the range of 0 to alf_luma_num_filters_signalled_minus1.

In some examples, the clipping values in table 500 can be calculated for a luma component based on Equation (14) below, and for a chroma component based on Equation (15) below. For example, the clipping value c(k,l) can be calculated as follows:

$$c(k,l)=1<<(\text{BitDepth}Y-\text{offset}Y[\text{clipIdx}(k,l)]) \text{ for luma; and}$$

$$c(k,l)=1<<(\text{BitDepth}C-\text{offset}C[\text{clipIdx}(k,l)]) \text{ for chroma.} \quad \text{Equation (14)}$$

In Equation (14), the term "<<" is a left shift arithmetic operator, and offsetY[i] and offsetC[i], with I=0, 1, 2, or 3, are pre-defined or calculated values based on the clipping index (clipIdx). In some examples, offsetY={0, 3, 5, 7} and offsetC={0, 3, 5, 7}. Here, 0, 3, 5, and 7 can be pre-determined values set for offsetY and offsetC. In some examples, the specific value for offsetY and offsetC from the range 0−BitDepthY for luma and 0−BitDepthC for chroma can be determined based on the clipping index (clipIdx) value, which in some examples can be in the range of 0 to 3, inclusive. For example, when the value of clipIdx equals 0, the offsetY and offsetC value can be 0, when the value of clipIdx equals 1, the offsetY and offsetC value can be 3, when the value of clipIdx equals 2, the offsetY and offsetC value can be 5, and when the value of clipIdx equals 3, the offsetY and offsetC value can be 7.

The Equation (14) can efficiently calculate the clipping values in table 500 based on the corresponding bit depth values 504-520 and clipping index values 524-530, and can simplify such calculations based on integer arithmetic. For example, using Equation (14), given the offset values of 0, 3, 5, and 7 and a bit depth value of 8 (504), the clipping value for c(k,l) can be calculated as follows. If c(k,l)=1<<(BitDepth−offset[clipIdx(k,l)]), and BitDepth=8 and clipIdx=0, then offset[0]=0. Accordingly, c(k,l) equals 1<<(8−0), which equals 1 left shift 8. Left arithmetic shift by n is equivalent to multiplying by $2^n$. Therefore, 1 left shift 8 is equal to $2^8$. Thus, when the bit depth value is 8 and the offset value is 0, c(k,l) equals $2^8$, as illustrated in table 500.

Similarly, when BitDepth=8 and clipIdx=1, then offset[1]=3. Accordingly, c(k,l) equals 1<<(8−3), which equals 1 left shift 5 or $2^5$. Thus, when the bit depth value is 8 and the offset value is 3, c(k,l) equals $2^5$, as illustrated in table 500.

When BitDepth=8, and clipIdx=2, then offset[2]=5. Accordingly, c(k,l) equals 1<<(8−5), which equals 1 left shift 3 or $2^3$. Thus, when the bit depth value is 8 and the offset value is 5, c(k,l) equals $2^3$, as illustrated in table 500.

Finally, when BitDepth=8, and clipIdx=3, then offset[3]=7. Accordingly, c(k,l) equals 1<<(8−7), which equals 1 left shift 1 or $2^1$. Thus, when the bit depth value is 8 and the offset value is 7, c(k,l) equals $2^1$, as illustrated in table 500.

The example calculations above can similarly be performed for bit depth values 506-520 (e.g., 9 through 16) based on offset values 0, 3, 5, 7 and clipping index values 0, 1, 2, and 3, to produce the corresponding clipping values shown in table 500. For example, as illustrated in table 500, the clipping value produced based on Equation (14) for a bit depth of 9 and a clipping index value of 0 is $2^9$, the clipping value produced based on Equation (14) for a bit depth of 9 and a clipping index value of 1 is $2^6$, the clipping value produced based on Equation (14) for a bit depth of 9 and a clipping index value of 2 is $2^4$, and the clipping value produced based on Equation (14) for a bit depth of 9 and a clipping index value of 3 is $2^2$.

Such calculations using left arithmetic shift and no floating-point numbers can significantly simplify the clipping value calculations, reduce burden on hardware and compute resources of such calculations, and reduce decoding errors. In addition, the clipping operation can be implemented as logical or/and the most significant bits from the (BitDepth−offset[clipIdx(k,l)]+1) bit to the least significant bit. This can also reduce the burden on hardware.

In other illustrative examples, using integer arithmetic, the clipping value c(k,l) calculations can be implemented as follows:

$$c(k,l)=1<<((4*\text{BitDepth}Y-\text{BitDepth}Y\,\text{clipIdx}(k,l))>>2) \text{ for luma; and}$$

$$c(k,l)=1<<((3*\text{BitDepth}C-8*\text{clipIdx}(k,l))/3) \text{ for chroma.} \quad \text{Equation (15)}$$

In another illustrative example, the clipping value c(k,l) for the luma component can be calculated as in Equation (16) below. In particular, the equation $c(k,l)=\text{Round}(2^{(\text{BitDepth}Y*(4-\text{clipIdx}(k,l))/4)})$ can be rewritten as follows:

$$c(k,l) = \text{Round}\left(2^{(\text{BitDepth}Y-(\text{BitDepth}Y*\text{clipIdx}(k,l))/4)}\right) = \quad \text{Equation (16)}$$
$$\text{Round}\left(2^{(\text{BitDepth}Y-a-b/4)}\right)$$
$$= \text{Round}\left(2^{(\text{BitDepth}Y-a)}*2^{-b/4}\right) =$$
$$((1 << (\text{BitDepth}Y - a)) * \text{remY}[b]) >> c$$

Here, a equals (BitDepthY*clipIdx(k,l))>>2, b equals (BitDepthY*clipIdx(k,l)) and 0x03, remY[b] is equivalent to Round($2^{-b/4}$*(1<<c)) in floating-point arithmetic, b equals 0, 1, 2 or 3, and c is a pre-defined integer value. In some examples, the values of remY[b] can be stored as look-up table (LUT) in integer values. In this example from Equation (16), c[k,l] can be calculated with integer arithmetic and without using floating-point numbers.

In such an illustrative example, the clipping value c(k,l) for a chroma component can be calculated as follows:

$$c(k,l) = \text{Round}\left(2^{(\text{BitDepth}C-8)}*2^{(8*(3-\text{clipIdx}[k,l])/3)}\right) = \quad \text{Equation (17)}$$
$$\text{Round}\left(2^{\text{BitDepth}C}*2^{-8*\text{clipIdx}(k,l)/3}\right)$$
$$= \text{Round}\left(2^{\text{BitDepth}C-a-b/3}\right) =$$
$$\text{Round}\left(1 << (\text{BitDepth}C - a)*2^{-b/3}\right)$$
$$= ((1 << (\text{BitDepth}C - a)) * \text{remC}[b]) >> c$$

Here, a equals 8*clipIdx(k,l)/3, b equals [8*clipIdx(k,l)] modular 3, remC[b] is equivalent to Round($2^{-b/3}$*(1<<c))) in floating-point arithmetic, b equals 0, 1 or 2, and c is a pre-defined integer value. The values of remY[b] can be stored as LUT in integer values. In this example from Equation (17), c[k,l] can be calculated with integer arithmetic and without floating-point numbers.

In another illustrative example, for a luma component, the clipping value c(k,l) can be calculated as follows:

$$c(k,l)=1<<(\text{BitDepth}Y-\text{offset}Y[\text{clipIdx}(k,l)]), \quad \text{Equation (18)}$$

Moreover, for a chroma component, the clipping value c(k,l) can be calculated as follows:

$$c(k,l)=1<<(\text{BitDepth}C-\text{offset}C[\text{clipIdx}(k,l)]), \quad \text{Equation (19)}$$

In the above examples, the offsetY[i] and offsetC[i], with i equal to 0, 1, 2, or 3, are pre-defined or calculated values based on the clipping index (clipIdx(k,l)).

In some examples, clipping values for luma and/or chroma components can be calculated based on other methods (e.g., using other equations) that are not mentioned above with integer arithmetic.

In some implementations, the same equation can be used to calculate clipping values for luma and chroma components. For example, the same equation from Equation (14) described above can be used to calculate clipping values for luma and chroma components.

In one illustrative example, an equation with floating-point arithmetic can be used for calculating clipping values for both luma and chroma components. For instance, in some cases, one equation from Equations (11) and (12) can be used to calculate clipping values for both luma and chroma components. Alternatively, other equations not provided herein may be used. In another illustrative example, an equation with integer arithmetic may be used. For instance, one equation from equations (14)-(19) may be used. Alternatively, other equations not provided herein may be used.

Figure 6:
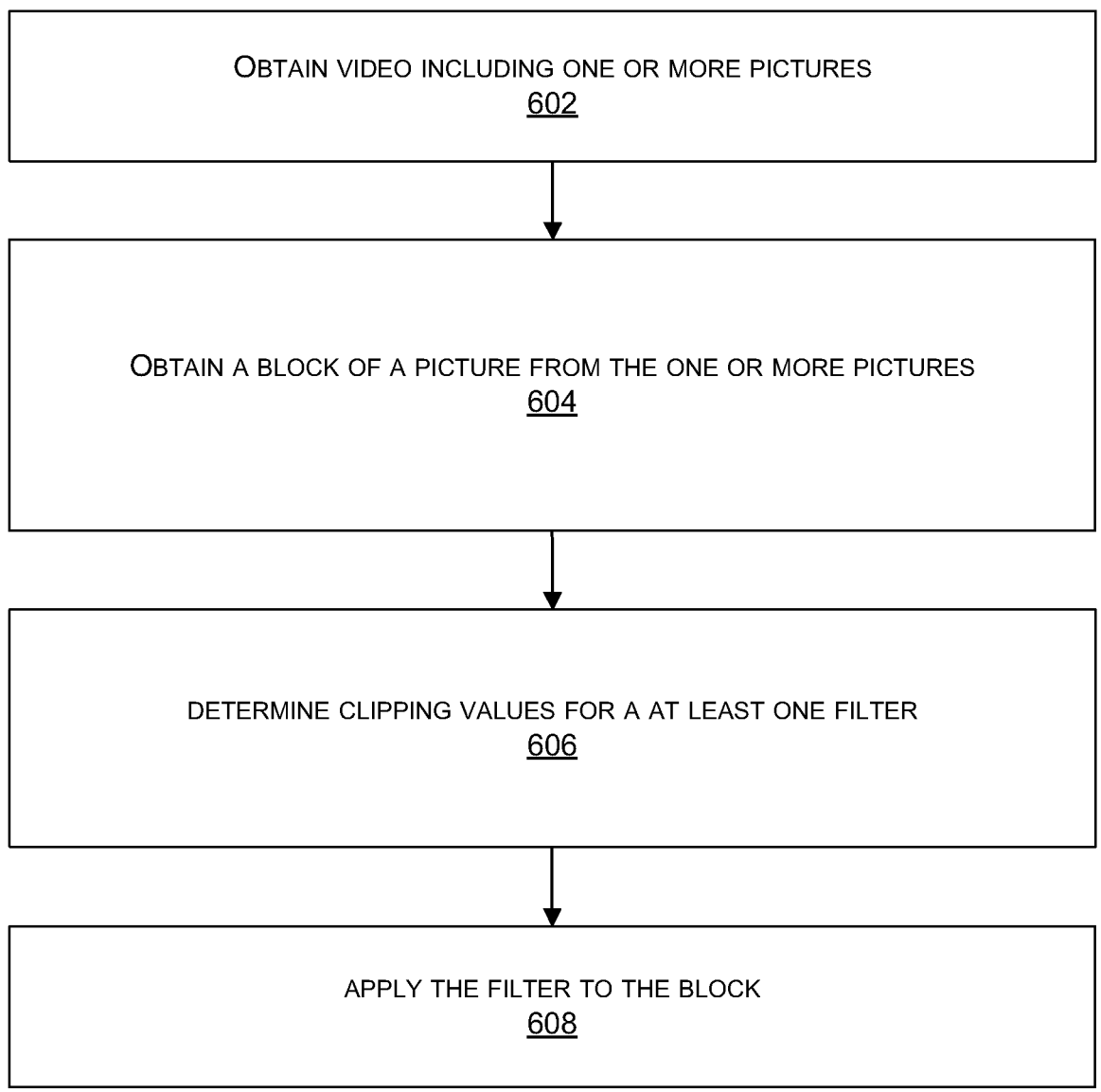
FIG. 6 is a flowchart illustrating an example method 600 for processing video data, in accordance with some examples of the present disclosure.

Having disclosed example systems, components and concepts, the disclosure now turns to the example method 600 for processing video data, as shown in FIG. 6. In some examples, the processing of video data by method 600 can include simplifying clipping value calculations for adaptive loop filtering. The steps outlined herein are non-limiting examples provided for illustration purposes, and can be implemented in any combination thereof, including combinations that exclude, add, or modify certain steps.

At block 602, the method 600 can include obtaining video data including one or more pictures. In some examples, an encoding device (e.g., 104) can receive the one or more pictures from a video source (e.g., 102), such as a camera. In some examples, a decoding device (e.g., 112) can receive, from an encoding device (e.g., 104), an encoded video bitstream including the one or more pictures. In some examples, the encoded video bitstream can include signaling information. The signaling information can include, for example and without limitation, an offset value used to determine clipping values as described below with respect to block 606, a clipping index value used to determine clipping values as described below with respect to block 606, filter parameters (e.g., filter coefficients, filter size parameters, filter shape parameters, etc.), and/or an adaptive loop filter flag (e.g., an ALF flag indicating whether luma and/or chroma ALF filtering is enabled).

At block 604, the method 600 can include obtaining a block of a picture from the one or more pictures. In some examples, an encoding device (e.g., 104) can partition the video data into one or more blocks including the block of the picture. In some examples, the block can be an encoded block in an encoded video bitstream, and a decoding device (e.g., 112) can decode the block of the picture using signaling information in the bitstream by applying a coding algorithm and/or standard that matches the coding algorithm and/or standard used to encode the block, the picture and/or the bitstream. In some examples, the decoding device can reconstruct the block of the picture as described with respect to system 100 shown in FIG. 1 and decoding device 112 shown in FIG. 8.

At block 606, the method 600 can include determining clipping values (e.g., c(k,l)) for at least one filter. In some examples, the clipping values can correspond to a luma component in the block of the picture and/or a chroma component in the block of the picture. In some examples, a clipping value is determined by left shifting a first integer by a second integer. In some cases, the second integer can include a result of a bit depth value for a sample (e.g., a luma sample, a chroma sample) from the block minus an offset value (e.g., offset[clipIdx(k,l)]) associated with a clipping index value (e.g., clipIdx(k,l). For example, in some cases, each clipping value can be determined based on Equation (14) as previously described.

In some cases, the first integer is 1, and left shifting the first integer by the second integer includes raising 2 to a power of an exponent equivalent to the second integer. For example, if the first integer is 1 and the second integer is 8, left shifting the first integer by the second integer can equal to 2 raised to the power of 8 or $2^8$.

In some examples, the clipping values can include a first set of clipping values for the luma component and a second set of clipping values for the chroma component. In some cases, the first set of clipping values for the luma component and the second set of clipping values for the chroma component can be both determined by left shifting the first integer by the second integer, as described with respect to block 606.

In some cases, the clipping values can correspond to a set of filter clipping values in a clipping index table (e.g., table 500), and different clipping values of the set of filter clipping values in the clipping index table can correspond to different positions within the block and/or picture (e.g., k,l). In some examples, the different positions within the block and/or picture can include different pixel locations and/or regions in the picture.

In some cases, the offset value can be a predetermined offset value from a plurality of predetermined offset values. For example, the offset value can be one of 0, 3, 5, or 7, as previously described with respect to Equation (14). In some cases, the offset value is determined from the plurality of predetermined offset values based on the clipping index value (e.g., based on clipIdx(k,l)). In some examples, determining the clipping values for the at least one filter can include determining corresponding clipping values for a plurality of samples (e.g., luma and/or chroma samples) from the picture, and each corresponding clipping value can be associated with a particular sample from the plurality of samples. In some cases, each corresponding clipping value can be determined by left shifting the first integer by a particular integer associated with the particular sample. The particular integer can include a particular result of a bit depth value for the particular sample minus a particular offset value from the plurality of predetermined offset values. In some examples, the particular offset value is determined from the plurality of predetermined offset values based on a particular clipping index value associated with the particular sample, as previously described.

In some cases, the clipping values for the at least one filter can include a luma clipping value for the luma component and a chroma clipping value for the chroma component. In some examples, the luma clipping value can be determined by left shifting the first integer by a third integer that includes a second result of the bit depth value for a luma sample from the block minus a luma offset value associated with a second clipping index value. In some examples, the chroma clipping value can be determined by left shifting the first integer by a fourth integer that includes a third result of the bit depth value for a chroma sample from the block minus a chroma offset value associated with a third clipping index value.

In some examples, the at least one filter can include an ALF. In some examples, the at least one filter include a 5×5 adaptive loop filter, such as filter 300 shown in FIG. 3A, and a 7×7 adaptive loop filter, such as filter 330 shown in FIG. 3B.

In some cases, determining the clipping values for the at least one filter can include determining filter coefficient values (e.g., f(k,l)) for the at least one filter. Moreover, in some aspects, at block 606, the method 600 can determine the clipping values using other techniques. For example, in some cases, the method 600 can determine the clipping values based on any of Equations (15) through (19) described above.

At block 608, the method 600 can include applying the at least one filter to the block. The method 600 can generate an output block including the block filtered and clipped based on the at least one filter. For example, the method 600 can generate an output block including the block filtered with an ALF and clipping based on the clipping values. Moreover, applying the at least one filter to the block can include applying filter coefficients and the clipping values to one or more samples (e.g., one or more luma and/or chroma samples) in the block.

In some cases, applying the at least one filter to the block can include applying a 5×5 adaptive loop filter to the chroma component and applying a 7×7 adaptive loop filter to the luma component. In some examples, the 5×5 adaptive loop filter and the 7×7 adaptive loop filter can have a diamond shape. In other examples, the at least one filter can include one or more other filter sizes and/or shapes.

In some examples, a decoding device (e.g., 112) can obtain an encoded video bitstream including the one or more pictures and decode the block of the picture from the encoded video bitstream. In some examples, the decoding device can identify signaling information associated with the encoded video bitstream, and use the signaling information to reconstruct the block, determine the clipping values for the at least one filter, determine one or more coefficients for the at least one filter, determine a filter size and/or shape, determine whether filtering is enabled, and/or apply the at least one filter to the reconstructed block. In some examples, the signaling information can include the offset value, the clipping index value, filter parameters (e.g., filter coefficients, filter size parameters, filter shape parameters, etc.), and/or an adaptive loop filter flag (e.g., an ALF flag indicating whether luma and/or chroma ALF filtering is enabled).

In some examples, the method 600 can include generating an encoded video bitstream (e.g., via an encoding device 104) including the one or more pictures and sending the encoded video bitstream to a decoding device (e.g., 112). In some cases, the encoded video bitstream can be sent with signaling information. The signaling information can include, for example, the offset value, the clipping index value, filter parameters (e.g., filter coefficients, filter size parameters, filter shape parameters, etc.), and/or an adaptive loop filter flag (e.g., an ALF flag indicating whether luma and/or chroma ALF filtering is enabled).

In some examples, the method 600 can include storing the encoded video bitstream. In some examples, the method 600 can include presenting the reconstructed video from the encoded video bitstream after reconstructing blocks of pictures in the encoded video bitstream and applying one or more ALF filters with clipping values to one or more of the blocks of the pictures in the encoded video.

In some implementations, the processes (or methods) described herein can be performed by a computing device or an apparatus, such as the system 100 shown in FIG. 1. For example, the processes can be performed by the encoding device 104 shown in FIG. 1 and FIG. 7, by another video source-side device or video transmission device, by the decoding device 112 shown in FIG. 1 and FIG. 7, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, mobile devices, Internet-of-Things (IoT) devices, HMDs, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface.

The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 7:
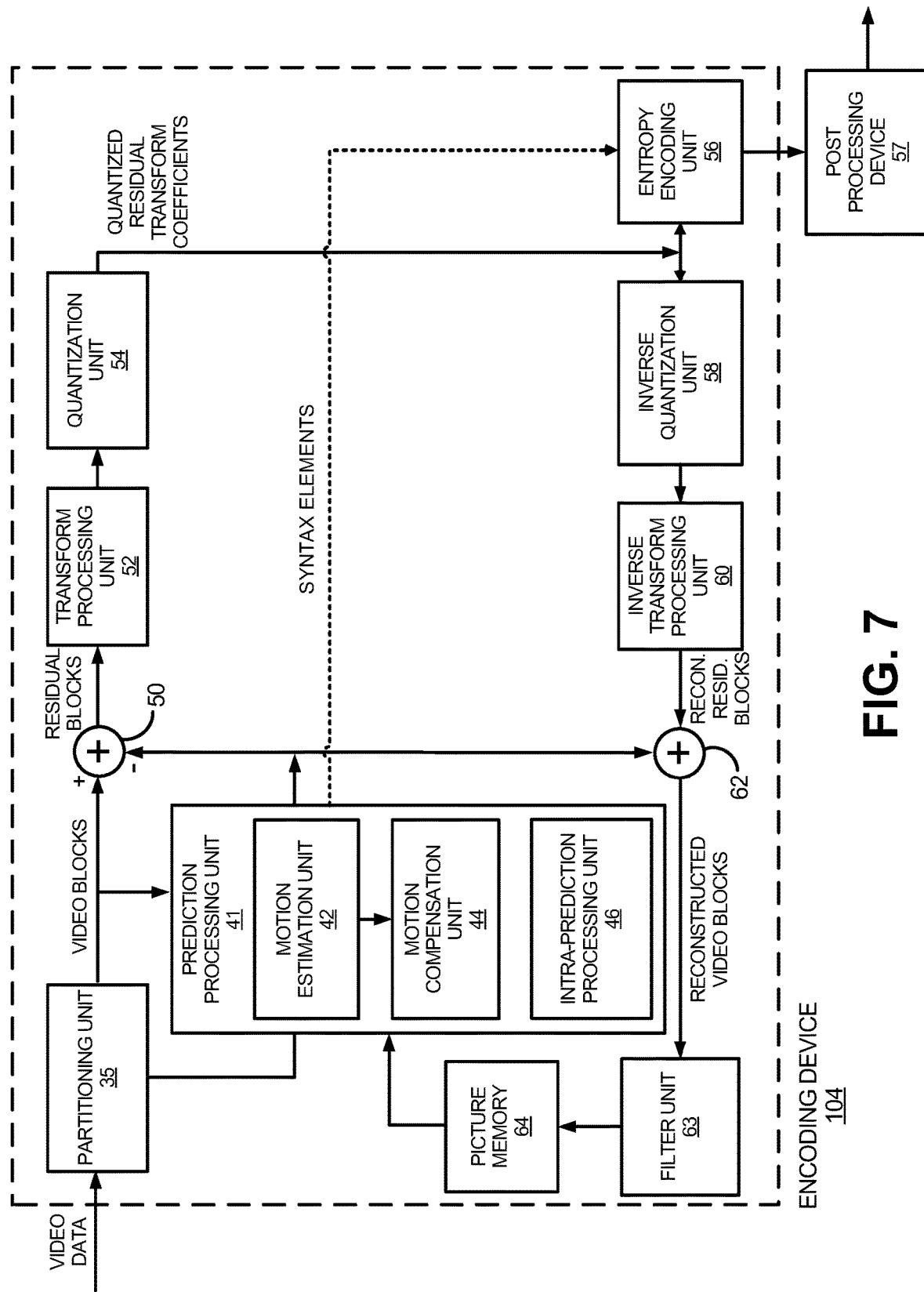
FIG. 7 is a block diagram illustrating an example video encoding device, in accordance with some examples of the present disclosure.
Figure 8:
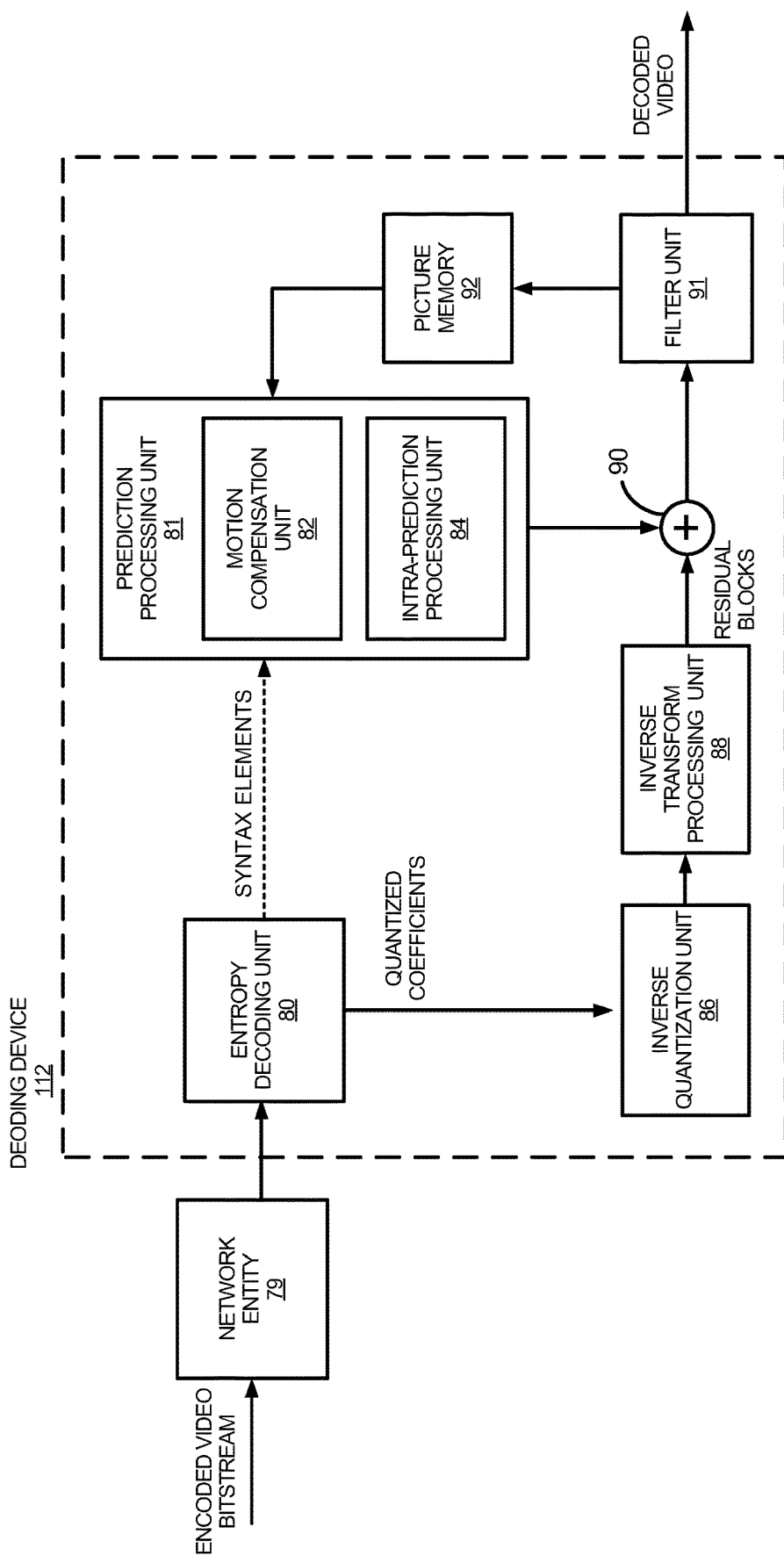
FIG. 8 is a block diagram illustrating an example video decoding device, in accordance with some examples of the present disclosure.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts.

The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In some examples, the encoding device 104 of FIG. 7 can represent an example of a video encoder configured to calculate ALF filter and clipping values, performing ALF filtering with clipping, derive various coding parameters, etc. The encoding device 104 may, for example, calculate ALF filter and clipping values and/or perform ALF filtering with clipping as described above. For instance, the encoding device 104 may perform any of the techniques described herein, including the processes and techniques described above with respect to FIGS. 2A through 6. In some cases, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and/or a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In some examples, the decoding device 112 of FIG. 8 represents an example of a video decoder configured to calculate ALF filter and clipping values, perform ALF filtering with clipping, derive various coding parameters, etc. The decoding device 112 may, for example, calculate ALF filter and clipping values and perform ALF filtering with clipping as described above. For instance, the decoding device 112 may perform any of the techniques described herein, including the processes and techniques described above with respect to FIGS. 2A through 6.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1: A method comprising obtaining video data comprising one or more pictures; obtaining a block of a picture from the one or more pictures; determining clipping values for at least one filter, the clipping values corresponding to at least one of a luma component of the block and a chroma component of the block, wherein a clipping value of the clipping values is determined by left shifting a first integer by a second integer, the second integer comprising a result of a bit depth value for a sample from the block minus an offset value associated with a clipping index value; and applying the at least one filter to the block.

Example 2: A method according to Example 2, wherein the at least one filter comprises an adaptive loop filter.

Example 3: A method according to Example 1 or 2, wherein the clipping values comprise a first set of clipping values for the luma component and a second set of clipping values for the chroma component, wherein the first set of clipping values for the luma component and the second set of clipping values for chroma component are both determined by left shifting the first integer by the second integer.

Example 4: A method according to any of Examples 1 to 3, wherein the first integer is 1, and wherein left shifting the first integer by the second integer comprises raising 2 to a power of an exponent comprising the second integer.

Example 5: A method according to any of Examples 1 to 4, wherein the clipping values correspond to a set of filter clipping values in a clipping index table, wherein different filter clipping values of the set of filter clipping values in the clipping index table correspond to different positions within the picture.

Example 6: A method according to any of Examples 1 to 5, wherein the offset value comprises a predetermined offset value from a plurality of predetermined offset values, and wherein the offset value is determined from the plurality of predetermined offset values based on the clipping index value.

Example 7: A method according to any of Examples 1 to 6, wherein determining the clipping values for the at least one filter comprises determining corresponding clipping values for a plurality of samples from the picture, wherein each corresponding clipping value is associated with a particular sample from the plurality of samples, and wherein each corresponding clipping value is determined by left shifting the first integer by a particular integer associated with the particular sample, the particular integer comprising a particular result of the bit depth value for the particular sample minus a particular offset value from the plurality of predetermined offset values.

Example 8: A method according to any of Examples 1 to 7, wherein the particular offset value is determined from the plurality of predetermined offset values based on a particular clipping index value associated with the particular sample.

Example 9: A method according to any of Examples 1 to 8, wherein the clipping values for the at least one filter comprise one or more luma clipping values for the luma component and one or more chroma clipping values for the chroma component, wherein the one or more luma clipping values are determined by left shifting the first integer by a third integer, the third integer comprising a second result of the bit depth value for a luma sample from the picture minus a luma offset value associated with a second clipping index value, and wherein the one or more chroma clipping values are determined by left shifting the first integer by a fourth integer, the fourth integer comprising a third result of the bit depth value for a chroma sample from the picture minus a chroma offset value associated with a third clipping index value.

Example 10: A method according to any of Examples 1 to 9, wherein the at least one filter comprises a 5×5 adaptive loop filter and a 7×7 adaptive loop filter, wherein applying the at least one filter to the block comprises applying the 5×5 adaptive loop filter to the chroma component and applying the 7×7 adaptive loop filter to the luma component.

Example 11: A method according to any of Examples 1 to 10, further comprising generating an encoded video bitstream comprising the one or more pictures.

Example 12: A method according to any of Examples 1 to 11, wherein the encoded video bitstream is generated based on the video data and a result of applying the at least one filter to the block.

Example 13: A method according to any of Examples 1 to 12, further comprising sending the encoded video bitstream to a decoding device, the encoded video bitstream being sent with signaling information, the signaling information comprising at least one of the offset value, the clipping index value, filter parameters, and an adaptive loop filter flag.

Example 14: A method according to any of Examples 1 to 13, further comprising storing the encoded video bitstream.

Example 15: A method according to any of Examples 1 to 14, further comprising obtaining an encoded video bitstream comprising the one or more pictures; decoding the block of the picture from the encoded video bitstream; and identifying signaling information associated with the encoded video bitstream, the signaling information comprising at least one of the offset value, the clipping index value, filter parameters, and an adaptive loop filter flag.

Example 16: A method according to any of Examples 1 to 15, wherein decoding the block of the picture from the encoded video bitstream comprises reconstructing the block of the picture, and wherein applying the at least one filter comprises applying the at least one filter to the reconstructed block.

Example 17: An apparatus comprising memory; and one or more processors coupled to the memory, the one or more processors being configured to obtain video data comprising one or more pictures; obtain a block of a picture from the one or more pictures; determine clipping values for at least one filter, the clipping values corresponding to at least one of a luma component of the block and a chroma component of the block, wherein a clipping value of the clipping values is determined by left shifting a first integer by a second integer, the second integer comprising a result of a bit depth value for a sample from the block minus an offset value associated with a clipping index value; and apply the at least one filter to the block.

Example 18: An apparatus according to Example 18, wherein the at least one filter comprises an adaptive loop filter.

Example 19: An apparatus according to Example 17 or 18, wherein the clipping values comprise a first set of clipping values for the luma component and a second set of clipping values for the chroma component, wherein the first set of clipping values for the luma component and the second set of clipping values for chroma component are both determined by left shifting the first integer by the second integer.

Example 20: An apparatus according to any of Examples 17 to 19, wherein the first integer is 1, and wherein left shifting the first integer by the second integer comprises raising 2 to a power of an exponent comprising the second integer.

Example 21: An apparatus according to any of Examples 17 to 20, wherein the clipping values correspond to a set of filter clipping values in a clipping index table, wherein different filter clipping values of the set of filter clipping values in the clipping index table correspond to different positions within the picture.

Example 22: An apparatus according to any of Examples 17 to 21, wherein the offset value comprises a predetermined offset value from a plurality of predetermined offset values, and wherein the offset value is determined from the plurality of predetermined offset values based on the clipping index value.

Example 23: An apparatus according to any of Examples 17 to 22, wherein determining the clipping values for the at least one filter comprises determining corresponding clipping values for a plurality of samples from the picture, wherein each corresponding clipping value is associated with a particular sample from the plurality of samples, and wherein each corresponding clipping value is determined by left shifting the first integer by a particular integer associated with the particular sample, the particular integer comprising a particular result of the bit depth value for the particular sample minus a particular offset value from the plurality of predetermined offset values.

Example 24: An apparatus according to any of Examples 17 to 23, wherein the particular offset value is determined from the plurality of predetermined offset values based on a particular clipping index value associated with the particular sample.

Example 25: An apparatus according to any of Examples 17 to 25, wherein the clipping values for the at least one filter comprise one or more luma clipping values for the luma component and one or more chroma clipping values for the chroma component, wherein the one or more luma clipping values are determined by left shifting the first integer by a third integer, the third integer comprising a second result of the bit depth value for a luma sample from the picture minus a luma offset value associated with a second clipping index value, and wherein the one or more chroma clipping values are determined by left shifting the first integer by a fourth integer, the fourth integer comprising a third result of the bit depth value for a chroma sample from the picture minus a chroma offset value associated with a third clipping index value.

Example 26: An apparatus according to any of Examples 17 to 25, wherein the at least one filter comprises a 5×5 adaptive loop filter and a 7×7 adaptive loop filter, wherein applying the at least one filter to the block comprises applying the 5×5 adaptive loop filter to the chroma component and applying the 7×7 adaptive loop filter to the luma component.

Example 27: An apparatus according to any of Examples 17 to 26, the one or more processors being configured to generate an encoded video bitstream comprising the one or more pictures.

Example 28: An apparatus according to any of Examples 17 to 27, wherein the encoded video bitstream is generated based on the video data and a result of applying the at least one filter to the block.

Example 29: An apparatus according to any of Examples 17 to 28, the one or more processors being configured to send the encoded video bitstream to a decoding device, the encoded video bitstream being sent with signaling information, the signaling information comprising at least one of the offset value, the clipping index value, filter parameters, and an adaptive loop filter flag.

Example 30: An apparatus according to any of Examples 17 to 29, the one or more processors being configured to store the encoded video bitstream.

Example 31: An apparatus according to any of Examples 17 to 30, the one or more processors being configured to obtain an encoded video bitstream comprising the one or more pictures; decoding the block of the picture from the encoded video bitstream; and identifying signaling information associated with the encoded video bitstream, the signaling information comprising at least one of the offset value, the clipping index value, filter parameters, and an adaptive loop filter flag.

Example 32: An apparatus according to any of Examples 17 to 31, wherein decoding the block of the picture from the encoded video bitstream comprises reconstructing the block of the picture, and wherein applying the at least one filter comprises applying the at least one filter to the reconstructed block.

Example 33: An apparatus according to any of Examples 17 to 32, wherein the apparatus is a mobile computing device.

Example 34: An apparatus comprising means for performing a method according to any of Examples 1 to 16.

Example 35: A non-transitory computer-readable storage medium comprising instructions stored thereon which, when executed by one or more processors, cause the one or more processors to obtain video data comprising one or more pictures; obtain a block of a picture from the one or more pictures; determine clipping values for at least one filter, the clipping values corresponding to at least one of a luma component of the block and a chroma component of the block, wherein a clipping value of the clipping values is determined by left shifting a first integer by a second integer, the second integer comprising a result of a bit depth value for a sample from the block minus an offset value associated with a clipping index value; and apply the at least one filter to the block.

Example 36: A non-transitory computer-readable storage medium according to Example 35, wherein the at least one filter comprises an adaptive loop filter.

Example 37: A non-transitory computer-readable storage medium according to Example 35 or 36, wherein the clipping values comprise a first set of clipping values for the luma component and a second set of clipping values for the chroma component, wherein the first set of clipping values for the luma component and the second set of clipping values for chroma component are both determined by left shifting the first integer by the second integer.

Example 38: A non-transitory computer-readable storage medium according to any of Examples 35 to 37, wherein the first integer is 1, and wherein left shifting the first integer by the second integer comprises raising 2 to a power of an exponent comprising the second integer.

Example 39: A non-transitory computer-readable storage medium according to any of Examples 35 to 38, wherein the clipping values correspond to a set of filter clipping values in a clipping index table, wherein different filter clipping values of the set of filter clipping values in the clipping index table correspond to different positions within the picture.

Example 40: A non-transitory computer-readable storage medium according to any of Examples 35 to 39, wherein the offset value comprises a predetermined offset value from a plurality of predetermined offset values, and wherein the offset value is determined from the plurality of predetermined offset values based on the clipping index value.

Example 41: A non-transitory computer-readable storage medium according to any of Examples 35 to 40, wherein determining the clipping values for the at least one filter comprises determining corresponding clipping values for a plurality of samples from the picture, wherein each corresponding clipping value is associated with a particular sample from the plurality of samples, and wherein each corresponding clipping value is determined by left shifting the first integer by a particular integer associated with the particular sample, the particular integer comprising a particular result of the bit depth value for the particular sample minus a particular offset value from the plurality of predetermined offset values.

Example 42: A non-transitory computer-readable storage medium according to any of Examples 35 to 41, wherein the particular offset value is determined from the plurality of predetermined offset values based on a particular clipping index value associated with the particular sample.

Example 43: A non-transitory computer-readable storage medium according to any of Examples 35 to 42, wherein the clipping values for the at least one filter comprise one or more luma clipping values for the luma component and one or more chroma clipping values for the chroma component, wherein the one or more luma clipping values are determined by left shifting the first integer by a third integer, the third integer comprising a second result of the bit depth value for a luma sample from the picture minus a luma offset value associated with a second clipping index value, and wherein the one or more chroma clipping values are determined by left shifting the first integer by a fourth integer, the fourth integer comprising a third result of the bit depth value for a chroma sample from the picture minus a chroma offset value associated with a third clipping index value.

Example 44: A non-transitory computer-readable storage medium according to any of Examples 35 to 43, wherein the at least one filter comprises a 5×5 adaptive loop filter and a 7×7 adaptive loop filter, wherein applying the at least one filter to the block comprises applying the 5×5 adaptive loop filter to the chroma component and applying the 7×7 adaptive loop filter to the luma component.

Example 45: A non-transitory computer-readable storage medium according to any of Examples 35 to 44, comprising instructions which, when executed by one or more processors, cause the one or more processors generate an encoded video bitstream comprising the one or more pictures.

Example 46: A non-transitory computer-readable storage medium according to any of Examples 35 to 45, wherein the encoded video bitstream is generated based on the video data and a result of applying the at least one filter to the block.

Example 47: A non-transitory computer-readable storage medium according to any of Examples 35 to 46, comprising instructions which, when executed by one or more processors, cause the one or more processors to send the encoded video bitstream to a decoding device, the encoded video bitstream being sent with signaling information, the signaling information comprising at least one of the offset value, the clipping index value, filter parameters, and an adaptive loop filter flag.

Example 48: A non-transitory computer-readable storage medium according to any of Examples 35 to 47, comprising instructions which, when executed by one or more processors, cause the one or more processors to store the encoded video bitstream.

Example 49: A non-transitory computer-readable storage medium according to any of Examples 35 to 48, comprising instructions which, when executed by one or more processors, cause the one or more processors to obtain an encoded video bitstream comprising the one or more pictures; decoding the block of the picture from the encoded video bitstream; and identifying signaling information associated with the encoded video bitstream, the signaling information comprising at least one of the offset value, the clipping index value, filter parameters, and an adaptive loop filter flag.

Example 50: A non-transitory computer-readable storage medium according to any of Examples 35 to 49, wherein decoding the block of the picture from the encoded video bitstream comprises reconstructing the block of the picture, and wherein applying the at least one filter comprises applying the at least one filter to the reconstructed block.

Example 51: A non-transitory computer-readable storage medium according to any of Examples 35 to 50, wherein the non-transitory computer-readable storage medium is a mobile computing device.

Example 52: A method of processing video data, the method comprising obtaining an encoded video bitstream, the encoded video bitstream including one or more pictures; decoding, from the encoded video bitstream, a picture from the one or more pictures; determining clipping values for a filter using integer arithmetic, the clipping values including a clipping value for a luma component and at least one clipping value for at least one chroma component, wherein the clipping value for the luma component is determined based on a bit depth for the luma component and a clipping index, and wherein the at least one clipping value for the at least one chroma component is determined based on a bit depth for the at least one chroma component and the clipping index; and applying the filter to the decoded picture.

Example 53: A method according to Example 52, wherein the filter includes an adaptive loop filter.

Example 54: A method according to Examples 52 or 53, wherein the clipping index includes one or more clipping values at a position within the picture.

Example 55: A method according to any one of Examples 52 to 54, wherein the integer arithmetic includes applying one or more shift operations.

Example 56: A method according to Example 55, wherein a multiple shift operations are applied to determine the clipping value for the luma component.

Example 57: A method according to Examples 55 or 56, wherein a single shift operation is applied to determine the clipping value for the luma component.

Example 58: A method according to any one of Examples 52 to 57, wherein a single shift operation is applied to determine the at least one clipping value for the at least one chroma component.

Example 59: A method according to any one of Examples 52 to 58, wherein multiple shift operations are applied to determine the at least one clipping value for the at least one chroma component.

Example 60: A method according to any one of Examples 52 to 59, wherein the clipping value for the luma component is determined further based on a luma offset associated with the clipping index, and wherein the at least one clipping value for the at least one chroma component is determined further based on at least one chroma offset associated with the clipping index.

Example 61: A method according to any one of Examples 52 to 60, wherein a same equation is used to calculate the clipping value for the luma component and the at least one clipping value for the at least one chroma component.

Example 62: An apparatus comprising a memory configured to store video data and a processor configured to process the video data according to any of Examples 52 to 60.

Example 63: An apparatus according to Example 62, wherein the apparatus includes a decoder.

Example 64: An apparatus according to Example 62, wherein the apparatus includes an encoder.

Example 65: An apparatus according to any one of Examples 62 to 64, wherein the apparatus is a mobile device.

Example 66: An apparatus according to any one of Examples 62 to 65, further comprising a display configured to display the video data.

Example 67: An apparatus according to any one of Examples 62 to 66, further comprising a camera configured to capture one or more pictures.

Example 68: A computer readable medium having stored thereon instructions that when executed by a processor perform a method according to any of Examples 52 to 60.

What is claimed is:

1. A method of processing video data, the method comprising:
   obtaining video data comprising one or more pictures;
   obtaining a block of a picture from the one or more pictures;
   determining clipping values for at least one filter, the clipping values comprising a first set of clipping values corresponding to a luma component of the block and a second set of clipping values corresponding to a chroma component of the block, wherein a clipping value of the clipping values is determined by left shifting a first integer by a second integer, the second integer comprising a result of a bit depth value for a sample from the block minus an offset value associated with a clipping index value, and wherein the first set of clipping values corresponding to the luma component and the second set of clipping values corresponding to the chroma component are both determined by left shifting the first integer by the second integer, wherein the offset value comprises a first integer value associated with the luma component and a second integer value associated with the chroma component, the first integer value and the second integer value comprising one of 0, 3, 5, or 7; and
   applying the at least one filter to the block.

2. The method of claim 1, wherein the at least one filter comprises an adaptive loop filter.

3. The method of claim 1, wherein the first integer is 1, and wherein left shifting the first integer by the second integer comprises raising 2 to a power of an exponent comprising the second integer.

4. The method of claim 1, wherein the clipping values correspond to a set of filter clipping values in a clipping index table, wherein different filter clipping values of the set of filter clipping values in the clipping index table correspond to different positions within the picture.

5. The method of claim 1, wherein the offset value comprises a predetermined offset value from a plurality of predetermined offset values, and wherein the offset value is determined from the plurality of predetermined offset values based on the clipping index value.

6. The method of claim 5, wherein determining the clipping values for the at least one filter comprises determining corresponding clipping values for a plurality of samples from the picture, wherein each corresponding clipping value is associated with a particular sample from the plurality of samples, and wherein each corresponding clipping value is determined by left shifting the first integer by a particular integer associated with the particular sample, the particular integer comprising a particular result of the bit depth value for the particular sample minus a particular offset value from the plurality of predetermined offset values.

7. The method of claim 6, wherein the particular offset value is determined from the plurality of predetermined offset values based on a particular clipping index value associated with the particular sample.

8. The method of claim 1, wherein the first set of clipping values for the at least one filter comprise one or more luma clipping values for the luma component and the second set of clipping values comprise one or more chroma clipping values for the chroma component, wherein the one or more luma clipping values are determined by left shifting the first integer by a third integer, the third integer comprising a second result of the bit depth value for a luma sample from the picture minus a luma offset value associated with a second clipping index value, and wherein the one or more chroma clipping values are determined by left shifting the first integer by a fourth integer, the fourth integer comprising a third result of the bit depth value for a chroma sample from the picture minus a chroma offset value associated with a third clipping index value.

9. The method of claim 1, wherein the at least one filter comprises a 5×5 adaptive loop filter and a 7×7 adaptive loop filter, wherein applying the at least one filter to the block comprises applying the 5×5 adaptive loop filter to the chroma component and applying the 7×7 adaptive loop filter to the luma component.

10. The method of claim 1, further comprising:
    generating an encoded video bitstream comprising the one or more pictures.

11. The method of claim 10, wherein the encoded video bitstream is generated based on the video data and a result of applying the at least one filter to the block.

12. The method of claim 10, further comprising:
    sending the encoded video bitstream to a decoding device, the encoded video bitstream being sent with signaling information, the signaling information comprising at least one of the offset value, the clipping index value, filter parameters, and an adaptive loop filter flag.

13. The method of claim 10, further comprising:
    storing the encoded video bitstream.

14. The method of claim 1, further comprising:
    obtaining an encoded video bitstream comprising the one or more pictures;
    identifying signaling information associated with the encoded video bitstream, the signaling information comprising at least one of the offset value, the clipping index value, filter parameters, and an adaptive loop filter flag; and
    decoding the block of the picture from the encoded video bitstream.

15. The method of claim 14, wherein decoding the block of the picture from the encoded video bitstream comprises reconstructing the block of the picture, and wherein applying the at least one filter comprises applying the at least one filter to the reconstructed block.

16. An apparatus comprising:
    memory; and
    one or more processors coupled to the memory, the one or more processors being configured to:
        obtain video data comprising one or more pictures;
        obtain a block of a picture from the one or more pictures;
        determine clipping values for at least one filter, the clipping values comprising a first set of clipping values corresponding to a luma component of the block and a second set of clipping values corresponding to a chroma component of the block, wherein a clipping value of the clipping values is determined by left shifting a first integer by a second integer, the second integer comprising a result of a bit depth value for a sample from the block minus an offset value associated with a clipping index value, and wherein the first set of clipping values corresponding to the luma component and the second set of clipping values corresponding to the chroma component are both determined by left shifting the first integer by the second integer, wherein the offset value comprises a first integer value associated with the luma component and a second integer value associated with the chroma component, the first integer value and the second integer value comprising one of 0, 3, 5, or 7; and
        apply the at least one filter to the block.

17. The apparatus of claim 16, wherein the at least one filter comprises an adaptive loop filter.

18. The apparatus of claim 16, wherein the first integer is 1, and wherein left shifting the first integer by the second integer comprises raising 2 to a power of an exponent comprising the second integer.

19. The apparatus of claim 16, wherein the clipping values correspond to a set of filter clipping values in a clipping index table, wherein different filter clipping values of the set of filter clipping values in the clipping index table correspond to different positions within the picture.

20. The apparatus of claim 16, wherein the offset value comprises a predetermined offset value from a plurality of predetermined offset values, and wherein the offset value is determined from the plurality of predetermined offset values based on the clipping index value.

21. The apparatus of claim 20, wherein determining the clipping values for the at least one filter comprises determining corresponding clipping values for a plurality of samples from the picture, wherein each corresponding clipping value is associated with a particular sample from the plurality of samples, and wherein each corresponding clipping value is determined by left shifting the first integer by a particular integer associated with the particular sample, the particular integer comprising a particular result of the bit depth value for the particular sample minus a particular offset value from the plurality of predetermined offset values.

22. The apparatus of claim 21, wherein the particular offset value is determined from the plurality of predetermined offset values based on a particular clipping index value associated with the particular sample.

23. The apparatus of claim 16, wherein the first set of clipping values for the at least one filter comprise one or more luma clipping values for the luma component and the second set of clipping values comprise one or more chroma clipping values for the chroma component, wherein the one or more luma clipping values are determined by left shifting the first integer by a third integer, the third integer comprising a second result of the bit depth value for a luma sample from the picture minus a luma offset value associated with a second clipping index value, and wherein the one or more chroma clipping values are determined by left shifting the first integer by a fourth integer, the fourth integer comprising a third result of the bit depth value for a chroma sample from the picture minus a chroma offset value associated with a third clipping index value.

24. The apparatus of claim 16, wherein the at least one filter comprises a 5×5 adaptive loop filter and a 7×7 adaptive loop filter, wherein applying the at least one filter to the block comprises applying the 5×5 adaptive loop filter to the chroma component and applying the 7×7 adaptive loop filter to the luma component.

25. The apparatus of claim 16, the one or more processors being configured to:
    generate an encoded video bitstream comprising the one or more pictures.

26. The apparatus of claim 25, wherein the encoded video bitstream is generated based on the video data and a result of applying the at least one filter to the block.

27. The apparatus of claim 25, the one or more processors being configured to:
    send the encoded video bitstream to a decoding device, the encoded video bitstream being sent with signaling information, the signaling information comprising at least one of the offset value, the clipping index value, filter parameters, and an adaptive loop filter flag.

28. The apparatus of claim 25, the one or more processors being configured to:
    store the encoded video bitstream.

29. The apparatus of claim 16, one or more processors coupled to the memory, the one or more processors being configured to:
    obtain an encoded video bitstream comprising the one or more pictures;
    identify signaling information associated with the encoded video bitstream, the signaling information comprising at least one of the offset value, the clipping index value, filter parameters, and an adaptive loop filter flag; and
    decode the block from the encoded video bitstream.

30. The apparatus of claim 29, wherein decoding the block of the picture from the encoded video bitstream comprises reconstructing the block of the picture, and wherein applying the at least one filter comprises applying the at least one filter to the reconstructed block.

31. The apparatus of claim 16, wherein the apparatus is a mobile computing device.

32. A non-transitory computer-readable storage medium comprising:
    instructions stored thereon which, when executed by one or more processors, cause the one or more processors to:
        obtain video data comprising one or more pictures;
        obtain a block of a picture from the one or more pictures;
        determine clipping values for at least one filter, the clipping values comprising a first set of clipping values corresponding to a luma component of the block and a second set of clipping values corresponding to a chroma component of the block, wherein a clipping value of the clipping values is determined by left shifting a first integer by a second integer, the second integer comprising a result of a bit depth value for a sample from the block minus an offset value associated with a clipping index value, and wherein the first set of clipping values corresponding to the luma component and the second set of clipping values corresponding to the chroma component are both determined by left shifting the first integer by the second integer, wherein the offset value comprises a first integer value associated with the luma component and a second integer value associated with the chroma component, the first integer value and the second integer value comprising one of 0, 3, 5, or 7; and
apply the at least one filter to the block.

\* \* \* \* \*